(12) United States Patent
Tweedie

(10) Patent No.: US 9,089,247 B2
(45) Date of Patent: Jul. 28, 2015

(54) SURFACE TREATING APPLIANCE

(75) Inventor: Robert Lawrence Tweedie, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 465 days.

(21) Appl. No.: 13/642,424

(22) PCT Filed: Apr. 12, 2011

(86) PCT No.: PCT/GB2011/050724
§ 371 (c)(1),
(2), (4) Date: Dec. 21, 2012

(87) PCT Pub. No.: WO2011/131964
PCT Pub. Date: Oct. 27, 2011

(65) Prior Publication Data
US 2013/0097803 A1 Apr. 25, 2013

(30) Foreign Application Priority Data

Apr. 21, 2010 (GB) .................................. 1006657.9

(51) Int. Cl.
| | |
|---|---|
| *A47L 9/10* | (2006.01) |
| *A47L 7/04* | (2006.01) |
| *A47L 9/28* | (2006.01) |
| *B03C 3/017* | (2006.01) |
| *B03C 3/28* | (2006.01) |
| *H02N 1/08* | (2006.01) |

(52) U.S. Cl.
CPC . *A47L 9/102* (2013.01); *A47L 7/04* (2013.01); *A47L 9/10* (2013.01); *A47L 9/2868* (2013.01); *B03C 3/017* (2013.01); *B03C 3/28* (2013.01); *H02N 1/08* (2013.01)

(58) Field of Classification Search
CPC ......... A47L 9/102; A47L 9/2868; A47L 7/04; A47L 13/40; A47L 13/38; B08B 6/00; G03G 21/035; B30C 3/017; B30C 3/28; H04N 1/08
See application file for complete search history.

(56) References Cited

U.S. PATENT DOCUMENTS

| | | | |
|---|---|---|---|
| 4,186,030 A | * | 1/1980 | Armstrong ........................ 134/1 |
| 5,400,465 A | | 3/1995 | Bosses et al. |

(Continued)

FOREIGN PATENT DOCUMENTS

| | | |
|---|---|---|
| EP | 1 094 478 | 4/2001 |
| GB | 190805502 | 0/1909 |

(Continued)

OTHER PUBLICATIONS

International Search Report and Written Opinion mailed Jul. 5, 2011, directed to International Application No. PCT/GB2011/050724; 8 pages.

(Continued)

*Primary Examiner* — Dung Van Nguyen
(74) *Attorney, Agent, or Firm* — Morrison & Foerster LLP

(57) ABSTRACT

A surface treating appliance including an electrical influence machine comprising a first non electrically conductive support structure spaced from a second non electrically conductive support structure, at least one of the support structures being arranged to move with respect to the other support structure, and at least two charge collecting points, and further comprising an air turbine for rotating at least one of the support structures.

15 Claims, 18 Drawing Sheets

(56) References Cited

U.S. PATENT DOCUMENTS

| | | | |
|---|---|---|---|
| 5,920,954 A * | 7/1999 | Sepponen | 15/339 |
| 6,199,244 B1 | 3/2001 | Hilgers et al. | |
| 6,821,320 B1 | 11/2004 | Miyazaki | |
| 8,230,828 B2 * | 7/2012 | Yoshino et al. | 123/65 BA |
| 8,572,789 B2 * | 11/2013 | Horne | 15/1.51 |
| 8,635,741 B2 * | 1/2014 | Peng et al. | 15/339 |
| 2002/0047492 A1 | 4/2002 | Jones | |
| 2003/0130131 A1 | 7/2003 | Brotz | |
| 2005/0000054 A1 * | 1/2005 | Ninomiya et al. | 15/347 |
| 2013/0106240 A1 | 5/2013 | Tweedie | |

FOREIGN PATENT DOCUMENTS

| | | |
|---|---|---|
| GB | 392945 | 5/1933 |
| GB | 881633 | 11/1961 |
| GB | 2 274 052 | 7/1994 |
| JP | 3-244425 | 10/1991 |
| JP | 7-123639 | 5/1995 |
| JP | 10-127066 | 5/1998 |
| JP | 2003-269319 | 9/2003 |
| JP | 2005-129924 | 5/2005 |
| JP | 2008-543394 | 12/2008 |
| JP | 2010-12126 | 1/2010 |
| JP | 2010-69046 | 4/2010 |
| RU | 2005 134 729 | 5/2007 |
| SU | 1035759 | 8/1983 |
| WO | WO-95/17239 | 6/1995 |

OTHER PUBLICATIONS

Search Report dated Aug. 17, 2010, directed to GB Application No. 1006657.9; 1 page.

* cited by examiner

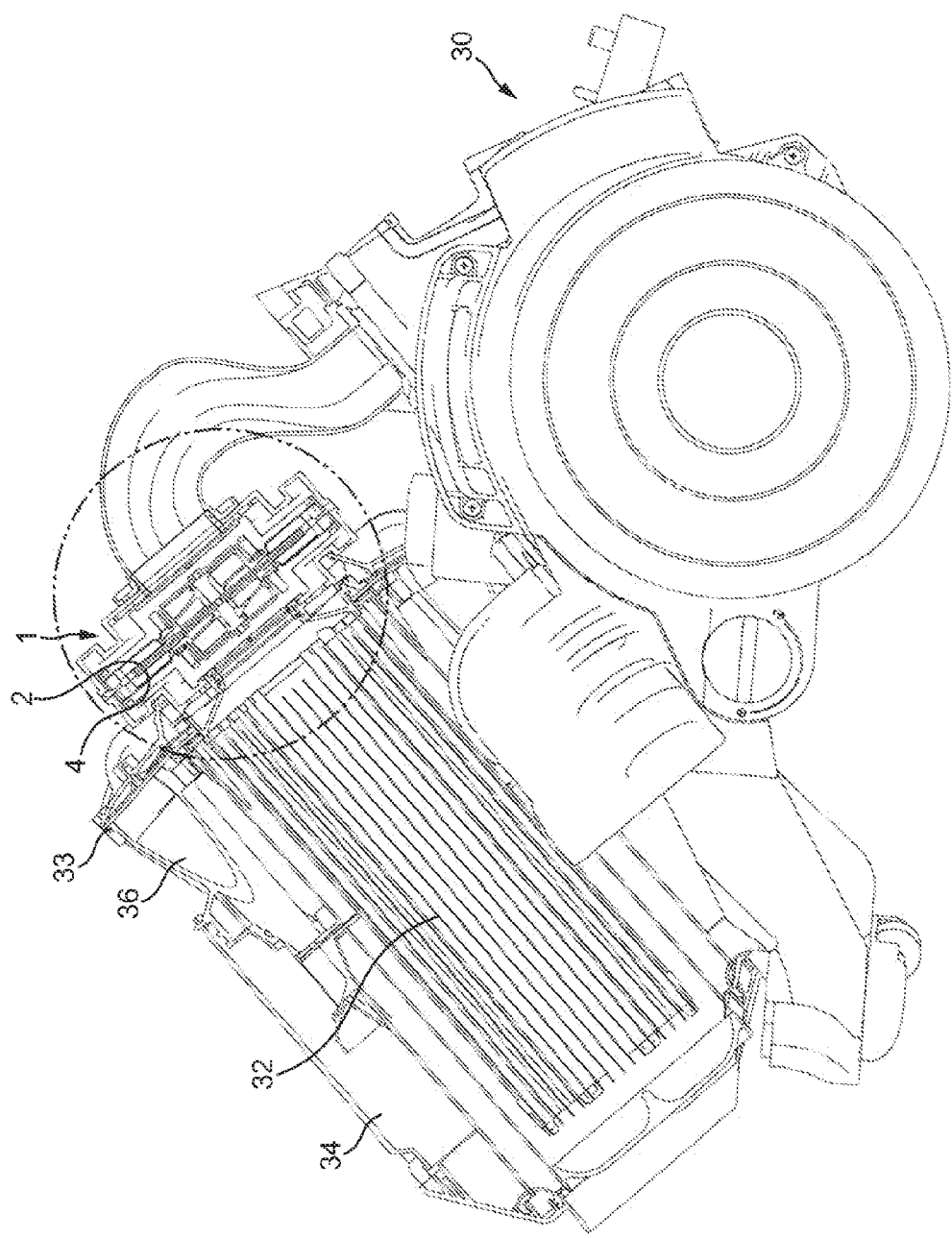

SURFACE TREATING APPLIANCE

REFERENCE TO RELATED APPLICATIONS

This application is a national stage application under 35 USC 371 of International Application No. PCT/GB2011/050724, filed Apr. 12, 2011, which claims the priority of United Kingdom Application No. 1006657.9, filed Apr. 21, 2010, the entire contents of which are incorporated herein by reference.

FIELD OF THE INVENTION

The present invention relates to a surface treating appliance, for separating particles from a fluid flow. Particularly, but not exclusively, the invention relates to a domestic vacuum cleaner for removing dust particles, from a dust laden airstream.

BACKGROUND OF THE INVENTION

In certain applications, for example in the manufacture of domestic cleaning appliances it is important that manufacturing costs are minimized. Any way of reducing the cost involved in manufacturing such domestic cleaning appliances whilst maintaining performance and quality would therefore be desirable.

SUMMARY OF THE INVENTION

Accordingly the present invention provides a surface treating appliance comprising an electrical influence machine.

Electrical influence machines were first invented in the $18^{th}$ century and their development continued well into the $19^{th}$ century when in the 1880's James Wimshurst developed the most widely known electrical influence machine, the so called "Wimshurst machine". Other examples of electrical influence machines include the "Holtz machine", the "Cavallo multiplier", the "Bohnenberger machine", the "Scwedoff machine", the "Leser machine", the "Pidgeon machine", the "Voss machine" and the "Wehrsen machine".

Electrical influence machines are electrostatic generators. Historically they have been used to produce high voltage, low current sources of electricity. They function by inducing electrostatic charges. This charge can then be collected from the electrical influence machine. Electrical influence machines work by inducing a build up of charge without friction, in other words the charge generation is frictionless. Electrical influence machines produce their output mechanically.

In the present invention any previously described electrical influence machine could be used, for example the electrical influence machine may be a Wimshurst machine. A schematic diagram showing how a Wimshurst machine generates electrical output is shown in FIG. 1.

The electrical influence machine 1 has two identical contra-rotatable disks 2, 4 which are shown schematically. Conductive metal foil sectors 6 are spaced concentrically around the disks 2, 4.

The machine also has first 8, second 10, third 12 and fourth 14 neutralising brushes which are arranged to make electrical contact with the conductive metal foil sectors 6 in turn as the disks 2, 4 rotate. On contact with the conductive metal foil sectors 6 these brushes 8, 10, 12, 14 return the conductive metal foil sectors 6 to a '0' potential. All four neutralising brushes 8, 10, 12, 14 can be seen to be electrically connected to each other so that they can effectively move charge around the electrical influence machine 1 altering the polarity of the conductive metal foil sectors 6.

The electrical influence machine 1 also has first 16, second 18, third 20 and fourth 22 charge collecting points which are arranged to draw off a portion of the charge which builds up in the conductive metal foil sectors 6 as the disks 2, 4 rotate.

Before the disks 2, 4 start spinning there will be a natural imbalance of charge across the conductive metal foil sectors 6 because the sectors are electrically insulated from each other. As the disks 2, 4 start to rotate the imbalance of charges between the conductive metal foil sectors 6 is increased due to induction between the conductive metal foil sectors 6 on opposing discs 2, 4.

Taking a positive conductive metal foil sector 24 on the first disk 2 as an example, as the disks 2, 4 rotate in the directions shown by arrows A and B the positively charged conductive metal foil sector 24 will move into each of the positions shown by the conductive metal foil sectors 6 in turn. As the positively charged conductive metal foil sector 24 moves it will first come into close proximity with a neutral conductive metal foil sector 26 on the opposite disk 4. The positively charged conductive metal foil sector 24 will induce a negative charge on the neutral conductive metal foil sector 26. The positively charged conductive metal foil sector 24 will then continue spinning in an anticlockwise direction inducing negative charges onto subsequent neutral conductive foil sectors 6 until it meets the second charge collecting point 18 at which point it will be partially discharged through corona discharge to the second charge collecting point 18.

The charged conductive metal foil sector which is still positively charged, but now less so, will then keep on moving in the direction of arrow A and will eventually contact the second neutralizing brush 10. This contact neutralizes the conductive metal foil sector and simultaneously, due to the connection between the first and second neutralizing brushes 8, 10 passes a positive charge to the opposite sector 28 on the first disk 2.

It can be seen that the conductive metal foil sector 29 which has just been neutralized by the second neutralizing brush 10 is now opposite a positively charge sector 31 on the second disk 4. This positively charged sector 31 therefore induces a negative charge on the recently neutralized sector 29.

The now negatively charged conductive metal foil sector 29 carries on travelling in the direction of arrow A until its negative charge is partially discharged by the first charge collecting point 16 and then neutralised by the first neutralizing brush 8.

These stages are repeated for all of the conductive metal foil sectors 6 while the disks 2, 4 of the electrical influence machine 1 are rotating. The electrical influence machine 1 soon reaches the maximum power output point shown in FIG. 1 where the regions of positive charge and negative charge are balanced. The electrical influence machine 1 soon reaches its limit based upon the sector area, disc speed, electric insulation and load resistance.

These electrical influence machines were developed mainly for the study of electricity and for entertainment purposes, as they can be arranged to generate large visible sparks of electricity.

In the late 1890's electrical influence machines were put to a more practical use in powering early x-ray experiments, radiography and electrotherapy, however their use to date has been very limited due to the low current output which is generated.

It has however been found that electrical influence machines can usefully be incorporated into surface treating appliances. For example an electrical influence machine could be used to power an electrostatic filter housed with a surface treating appliance or it could alternatively or additionally be used as an ozone generator in order to remove odours and/or kill bacteria.

The surface treating apparatus may therefore further comprise an electrostatic filter. Preferably the electrical influence machine is electrically connected to the electrostatic filter such that, during use, a high voltage current, generated by the electrical influence machine, is supplied to the electrostatic filter.

The use of an electrical influence machine may make it possible to produce a surface treating appliance, for example a domestic vacuum cleaner or floor sweeper, having an electrostatic filter, more cheaply than has previously been possible. This is because the electrical influence machine produces its power output mechanically. There is therefore no need to have a relatively expensive electronics PCB which would otherwise be needed to convert mains power into a high voltage power supply.

Using the electrical influence machine rather than converting a mains power source into a high voltage power source may also be safer in a domestic appliance. This is because there does not need to be any electrically conductive points which could be exposed to a user or could discharge through a user. This means that protective impedance circuitry may not be needed, thus further reducing manufacturing costs.

Additionally or alternatively, the electrical influence machine may be utilised as an ozone generator. Ozone is generated during the charge generation. Alternatively or additionally the electrical influence machine may be used to power an additional ozone generator to which the electrical influence machine may be connected. The use of an electrical influence machine may therefore make it possible to produce a surface treating appliance, for example a domestic vacuum cleaner having an ozone generator, more cheaply than has been previously possible. This is because the electrical influence machine produces its power output mechanically and therefore there is no need to have a relatively expensive electronics PCB which would otherwise be needed to convert mains power to the high voltage power supply necessary to produce ozone.

In a preferred embodiment the electrical influence machine may comprise a first non electrically conductive support structure spaced from a second non electrically conductive support structure, at least one of the support structures being arranged to move with respect to the other support structure, and at least two charge collecting points being arranged to collect charge from at least one of the support structures.

In a preferred embodiment at least one of the support structures may be arranged to rotate with respect to the other support structure.

The first and second support structures are preferably positioned at a distance where a charge on the first support structure will induce an opposite charge on the second support structure and a charge on the second support structure will induce an opposite charge on the first support structure. In a particular embodiment the first and second support structures may be spaced from 0.01 mm to 3.00 mm apart. In a more preferred embodiment the first and second support structures may be spaced from 0.1 mm to 1.00 mm apart. In a most preferred embodiment the first and second support structures may be spaced 0.75 mm apart.

Generally, embodiments of the invention feature a fluid for example air, gas, a gas mixture, oil, water or a combination of oil and water between the first and second support structures which is considered to support charge transfer. In an alternative embodiment, however, the first and second support structures may be arranged such that there is a vacuum between them, which may have a benefit in improving the efficiency of the device due to a reduction in air resistance of the spinning support structures. However, in order to support charge transfer in this case, it is believed that an electrical contact would be necessary between the charge pickup points and the conductive sectors. In a particular embodiment all or a portion of the electrical influence machine may be arranged in a fluid or vacuum.

Suitable non-electrically conductive materials for the first and second support structures are glass, rubber or plastics, for example acrylic, polycarbonate or Acrylonitrile butadiene styrene (ABS). The support structures are preferably formed from a material having a conductivity of less than $1 \times 10^{-11}$ S/cm measured at 25° C.

The support structures may be of any suitable shape, for example disk or dome shaped. They may alternatively be cylindrical such that one support structure fits inside the other support structure. Alternatively they may be in the form of a belt or other support which allows at least one of the support structures to move with respect to the other support structure. They may however be of any other suitable shape which allows at least one of the support structures to rotate with respect to the other support structure and where the first and second support structures are positioned at a distance where they can induce opposing charges on each other. In an embodiment where the support structures are disk shaped the disks may be from 20 mm, or 40 mm, or 60 mm, or 80 mm to 100 mm, or 120 mm, or 140 mm, or 160 mm, or 180 mm in diameter. In a preferred embodiment the disks may be from 60 to 120 mm in diameter.

Electrical influence machines rely on the fact that opposite charges attract each other. In any electrical influence machine at rest there will be a natural imbalance of charges before the at least one support structure starts to move. Once the at least one support structure starts moving the imbalance, say it is an area which has a slight negative charge, will induce a positive charge on the area which is opposite it on the other support structure. This induction effect therefore causes areas on one support structure to have a negative charge and areas on the other support structure to have a positive charge. These charges can be drawn off by the charge collecting points. The charge that is drawn off can then be put to use in the surface treating appliance for example by being directed to an electrostatic filter located in the surface treating appliance or for generating ozone.

The charge collecting points may be in contact with the first and/or second support structures. Alternatively one or more of the charge collecting points may be spaced from the support structures. Having a gap between the support structures and the charge collecting points means that electrical discharge only removes a portion of the built up charge from the support structures. This allows a slight charge imbalance to remain in the electrical influence machine so that it can continue to generate more charge. In addition, a lack of contact between the one or more charge collecting points and the support structures means that no friction is generated and therefore the one or more charge collecting points will not slow down movement of the support structures. One or more of the charge collecting points may be in the form of a conductive tip, conductive brush, sharp or rounded point. The conductive tips may have flat or rounded ends but are preferably pointed or conical in shape with the pointed end preferably directed towards the support structures. In a particular embodiment the charge collecting points may be spaced from 0.01 to 5.00 mm from the support structures depending on the scale of the device. Suitable materials for the charge collecting points could be metallic or non-metallic conductors such as copper or steel wire, or carbon brushes such as those used in a DC motor commutator, which may be more suitable for large-scale devices.

In an embodiment, a fluid for example air, gas, a gas mixture, oil, water or a combination of oil and water may be present between the charge collecting points and the support structures. In an alternative embodiment the charge collecting points and the support structures may be arranged such that there is a vacuum between them, although an electrical connection would be required between the charge collecting points and the support structures/conductive sectors.

The electrical influence machine preferably comprises at least four charge collecting points, in circumstances where the device has two contra-rotating disks. In a preferred embodiment there is a negative and a positive charge collecting point associated with both the first and the second support structures. This advantageously may help to draw charge evenly from the electrical influence machine.

In electrical influence machines where only one of the support structures moves, the stationary support structure may, but not necessarily, need an input of charge in order to maintain an imbalance of charge between the first and second support structures. Such an input of charge is believed to increase the speed at which the device progresses to full power generation. It is therefore desirable that both the first and second support structures move. This may advantageously help to ensure that there is always an inherent imbalance of charge between the first and second support structures. This advantageously may mean that an external input of charge does not need to be applied to the first and/or second support structure. It may also advantageously help to increase the charge produced. This is because the relative speed between the first and second support structures increases which in turn induces more power. It also may advantageously reduce the time it takes for the electrical influence machine to get to full power. It is most desirable that the first and second support structures are contra-rotatable.

The first and second support structures may be arranged to move/rotate at the same speed as each other. Alternatively the first and second support structures may be arranged to move/rotate at different speeds. The first and second support structures may be arranged to rotate at any possible speed, within the mechanical and electrical constraints of the device. A range of typical rotational speeds is between 10 to 10,000 RPM and more preferably from 60 to 4000 RPM.

In a preferred embodiment the electrical influence machine may further comprise a plurality of conductive sectors located on or embedded in opposed surfaces of the first and/or second support structures. The conductive sectors on each support structure are preferably arranged such that as the support structures move the conductive sectors on the first support structure pass the conductive sectors on the second support structure. The conductive sectors on each support structure are preferably arranged about an axis of rotation of the support structures such that as the support structures rotate the conductive sectors on the first support structure pass the conductive sectors on the second support structure. Preferably, although not essentially, there is an even number of conductive sectors on each support structure, for example there may be from 2, or 10, or 20, or 40, or 60 to 80, or 100, or 120, or 200 conductive sectors on each support structure. In a most preferred embodiment there are an equal number of conductive sectors on the first and second support structures.

In a preferred embodiment one or more of the conductive sectors may be embedded in the support structures such that the majority of the conductive sector is embedded in the support structure. This may advantageously electrically insulate the conductive sectors from each other. Preferably a portion of one or more of the conductive sectors remains exposed, i.e. a portion of one or more of the conductive sectors is not covered in the non conductive material from which the first and second support structures are made. The reason for the exposed portion(s) will be explained in more detail later.

The sectors are preferably coated on both sides with the electrically non conductive material from which the first and second support structures are formed. Preferably the layer of non conductive material on one or both sides of the sectors of is from 0.01 to 15 mm thick. More preferably it is from 0.2 mm to 3 mm thick and most preferably it is from 0.5 to 1 mm thick.

Adding conductive sectors may be advantageous because it may help to increase the overall charge which can be drawn from the electric influence machine. The conductive sectors may also help to increase the charge imbalance in the support structures at start up of the electrical influence machine. This is because they will each have a natural charge and they are electrically insulated from each other. This means that the electrical influence machine may be easier to start up and also it may reach full power more quickly than an electrical influence machine which does not have conductive sectors. The conductive sectors may also allow charge to be drawn from the electrical influence machine more easily than is possible in embodiments where there are no conductive sectors.

One or more of the conductive sectors may comprise a semi conductive material, a conductive material or a combination of a semi conductive material and a conductive material. Preferably the conductive sectors may be formed from a material having a conductivity of from $1 \times 10^6$ Siemens per meter (S/m) to $63 \times 10^6$ S/m measured at 25° C. In a most preferred embodiment the conductive sectors may be formed from a material having a conductivity of from $30 \times 10^6$ S/m to $63 \times 10^6$ S/m measured at 25° C.

In a preferred embodiment one or more of the conductive sectors may comprise a material with a specific surface area greater than the specific surface area of a self-supporting metal foil. As used herein the term "metal foil" shall be taken to mean a metal which has been formed into a thin sheet, for example by hammering or rolling. Expressed another way, the metal foil is self-supporting and, as such, has structural integrity, as opposed to a metal film that is formable on a surface by sputtering or vapour deposition techniques.

The term 'specific surface area' is used in its industry accepted context as a material property of a solid that indicates the total surface area per unit of mass of the solid. It should therefore be appreciated that specific surface area refers to the microscopic surface area of a material, rather than the macroscopic or geometric surface area of a material that can be discerned by the eye.

Specific surface area is typically expressed in units of $m^2$ per gram ($m^2/g$), and is determined by gas adsorption techniques such as BET surface area analysis using an inert gas such as nitrogen or krypton as the gas adsorbate, such analytical techniques being known in the art.

Preferably the material from which the conductive sector is formed has a surface area of 0.7 $m^2$ per gram or higher. In a preferred embodiment the material from which the conductive sector is formed has a surface area of from 1 $m^2$ per gram to 10000 $m^2$ per gram or higher. In a most preferred embodiment the material from which the conductive sector is formed has a surface area of from 100 $m^2$ per gram to 2000 $m^2$ per gram. Preferably the material from which the conductive sector is formed has a surface area of at least 1, or 2, or 3, or 4, or 5 orders of magnitude higher than the surface area of a metal foil.

Traditional electrical influence machines have used metal foils to form the conductive sectors. Such metal foils typically have a low surface area in the region of 0.07 m² per gram, based on a 0.01 mm thick foil. Using a material which has a higher surface area has advantageously been found to increase the charge which can build up in the conductive sectors. Increasing the charge that can be built up in the conductive sectors is very advantageous as it has been found to increase the amount of power that can be drawn from the electrical influence machine.

Using conductive sectors formed from a material having a surface area of 800 m² per gram has surprisingly been found to increase the output power by 1786 times over sectors formed from a metal foil.

The increased power output may also advantageously mean that the size of the electrical influence machine can be reduced compared to traditional electrical influence machines. It may also mean that the electrical influence machine is powerful enough to be used in applications which it previously would not have been suitable for, as the charge generated using metal foil sectors would have been too small.

In a preferred embodiment one or more of the conductive sectors may be formed from a granular material, powder or from a material which has had its surface area increased in some way. One or more of the sectors may for example be formed from a powdered metal, for example copper, zinc, gold, silver, nickel, steel or aluminium powder, or from carbon, germanium or silicone powder, activated carbon or carbon nanotubes.

Methods by which the specific surface area of a material can be increased include methods such as forming a powder, applying a metal dispersion to a carrier for example a fabric or mesh, for example by electrolysis or spray coating, and then allowing it to dry to form a "metallic fabric", scoring, etching or otherwise physically or chemically roughening the surface of a metal, sputtering for example adding a conductive layer to coat a conductive or non conductive granular or powdered material, for example zeolite. Activating carbon and forming carbon nanotubes are ways of increasing the specific surface area of carbon. Activated carbon is carbon which has been treated to form an open pore structure with a high specific surface area, and this amorphous, or non-crystalline allotrope of carbon is to be compared with crystalline allotropes of carbon, such as graphite typically having a surface area of less than 1 m² per gram. Methods of producing activated carbon are known. Likewise, industry accepted methods of growing single-walled and multi-walled carbon nanotubes are known, such as chemical vapour deposition, arc-discharge and laser ablation techniques.

In a preferred embodiment one or more of the conductive sectors may be formed from a semi conductive material coated onto a conductive material. In a preferred embodiment the semi conductive material may have a conductivity of from $1 \times 10^6$ S/m to 4.6 S/m. The conductive material may have a conductivity of from $1 \times 10^6$ S/m to $63 \times 10^6$ S/m. In such an embodiment it has been found that the semi conductive material may act as a charge storage substrate and the conductive material may act as a charge carrier substrate. This means that during use of the electrical influence machine charge may build up in the semi conductive layer. This charge can then be transferred to the conductive layer which allows easier collection of the charge from the support structures.

In one particular embodiment one or more of the conductive sectors may be formed from activated carbon (the semi conductive layer) coated onto a metal foil, powdered metal layer, or a "metallic fabric" (the conductive layer). The metal fabric may, for example, be in the form of a plastic mesh, for example a polyester mesh coated in copper, zinc, gold, silver, nickel, steel or aluminium. Using activated carbon has advantageously been found to greatly increase the charge which can be built up in the conductive sectors. This charge can then be passed to the conductive layer to be collected via the charge collectors.

In a particular embodiment the 2D surface area of the sectors may be from 20, or 50, or 100, or 150, or 200 to 250, or 300, or 350 or 400 mm². In a preferred embodiment the 2D surface area of the sectors may be from 50 to 150 mm², for example 100 mm².

The sectors may be from 0.0002, or 0.01, or 0.1, or 0.2, or 0.3, or 0.4 to 0.5, or 0.6, or 0.7, or 0.8, or 0.9, or 1 mm thick. In a preferred embodiment the sectors may be from 0.1 mm to 0.5 mm thick, for example they may be 0.4 mm thick.

The sectors may be of any suitable shape, for example they may be square, rectangular, oblong, circular or triangular. A desirable aspect is that the entire 2D surface area of the sectors on one support structure, pass over the entire 2D surface area of opposing sectors on the other support structure, when the support structures move.

The sectors may be irregular in shape such that the exposed portion is narrower than the remainder of the sector. In a preferred embodiment the exposed portion is reduced in size to help ensure the sectors do not discharge to each other.

The electrical influence machine may also further comprise a first electrically conductive neutralizing rod and a second electrically conductive neutralizing rod. Each neutralizing rod preferably has a first end and a second end. The first and second ends of the first electrically conducting neutralizing rod are preferably in contact with opposed sectors on the first support structure and the first and second ends of the second electrically conductive neutralizing rod are preferably in contact with opposed sectors on the second support structure. The first and second neutralizing rods may be in electrical contact with each other. The first and second neutralizing rods may be earthed.

In a preferred embodiment the first and second neutralizing rods may be offset from each other or arranged at right angles to each other. One or both of the neutralizing rods may be formed from a conductive material. Alternatively a conductive paint may be applied to one or more electrical support scaffolds to form one or both of the electrically conductive neutralizing rods. In a preferred embodiment the first and second ends of the neutralizing rods may be in contact with the exposed portions of the conductive sectors, such that as the support structures move the first and second ends of the neutralising rods touch each exposed portion of each conductive sector in turn. One or more of the ends may be in the form of a conductive tip, conductive brush, sharp or rounded point.

The neutralizing rods are advantageous because they move charge between conductive sectors to ensure that there is a large potential difference between conductive sectors on opposing support structures. Some of the charge can therefore be drawn off by the collecting points while some charge remains to pass along the neutralizing rods to maintain the charge imbalance in the electrical influence machine.

In a preferred embodiment the surface treating appliance may further comprise an air turbine for moving/rotating at least one of the support structures. During use of the surface treating appliance airflow may be arranged to move through the appliance. It has been found that this airflow can usefully be used to drive an air turbine which can drive movement/rotation of at least one of the support structures. In a preferred embodiment there may be a first air turbine for rotating the first support structure and a second air turbine for rotating the second support structure. Using the airflow which moves through the surface treating appliance during use advantageously may mean that no separate mechanical or electrical means are required for driving movement/rotation of the support structures.

Alternatively the surface treating appliance may further comprise one or more motors or other alternative drive mechanism for moving/rotating at least one of the support structures. Movement/rotation of one or both of the support structures may for example be driven by the main motor of the surface treating appliance or they may be driven by one or more dedicated motors.

The surface treating appliance may also further comprise one or more of the following, at least one cyclonic separator, a plurality of cyclones arranged in parallel, a filter. In a preferred embodiment the surface treating appliance comprises a single upstream cyclone, a plurality of downstream cyclones arranged in parallel in terms of airflow moving through the cyclones, an electrostatic filter arranged downstream of the plurality of parallel cyclones and an electrical influence machine arranged to supply a high voltage current to the electrostatic filter during use of the surface treating appliance. The electrical influence machine may be located in or on the main body of the surface treating appliance. Alternatively the electrical influence machine may be located in or on a surface treating head of the surface treating appliance. An electrostatic filter, if present, may be located in the main body of the surface treating appliance or in a surface treating head of the surface treating appliance.

In a particular embodiment the one or more air turbines and therefore the one or more support structures may be driven by air exhausting from the cyclonic separator and/or from a plurality of cyclones arranged in parallel, during use of the surface treating appliance.

In a preferred embodiment at least a portion of the electrical influence machine may be visible through a transparent portion of the surface treating appliance.

This invention is particularly suitable for inclusion in vacuum cleaners. However the term "surface treating appliance" is intended to have a broad meaning, and includes a wide range of appliances having a surface treating head for travelling over a surface to clean or treat the surface in some manner. It includes, inter alia, appliances which apply suction to the surface so as to draw material from it, such as vacuum cleaners (dry, wet and wet/dry), as well as appliances which apply material to the surface, such as shampooing machines and machines which treat a surface without suction, for example sweeping devices.

BRIEF DESCRIPTION OF THE DRAWINGS

The invention will now be described, by way of example, with reference to the accompanying drawings, in which:

FIG. 2a shows a side view of a cylinder vacuum cleaner comprising an electrical influence machine according to the present invention.

DETAILED DESCRIPTION OF THE INVENTION

Figure 1:
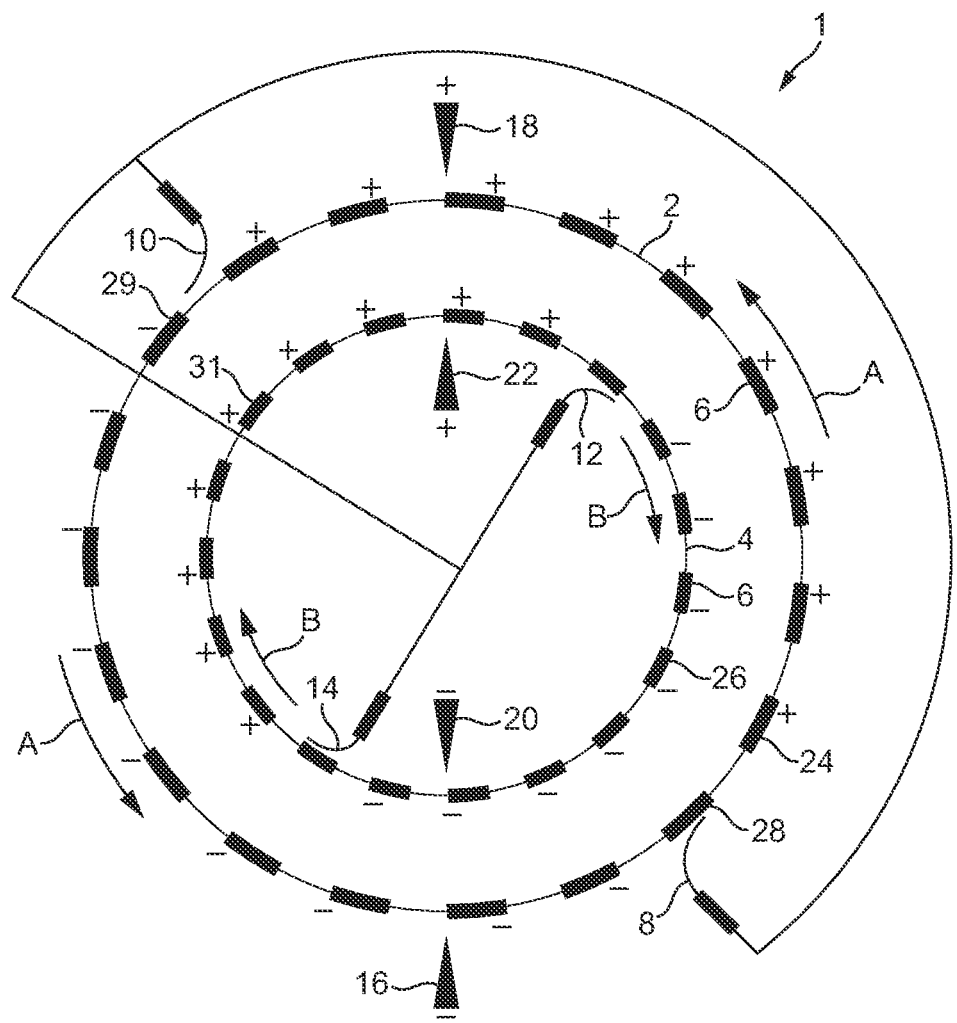
FIG. 1 shows a schematic diagram of a prior art Wimshurst electrical influence machine.
Figure 2B:
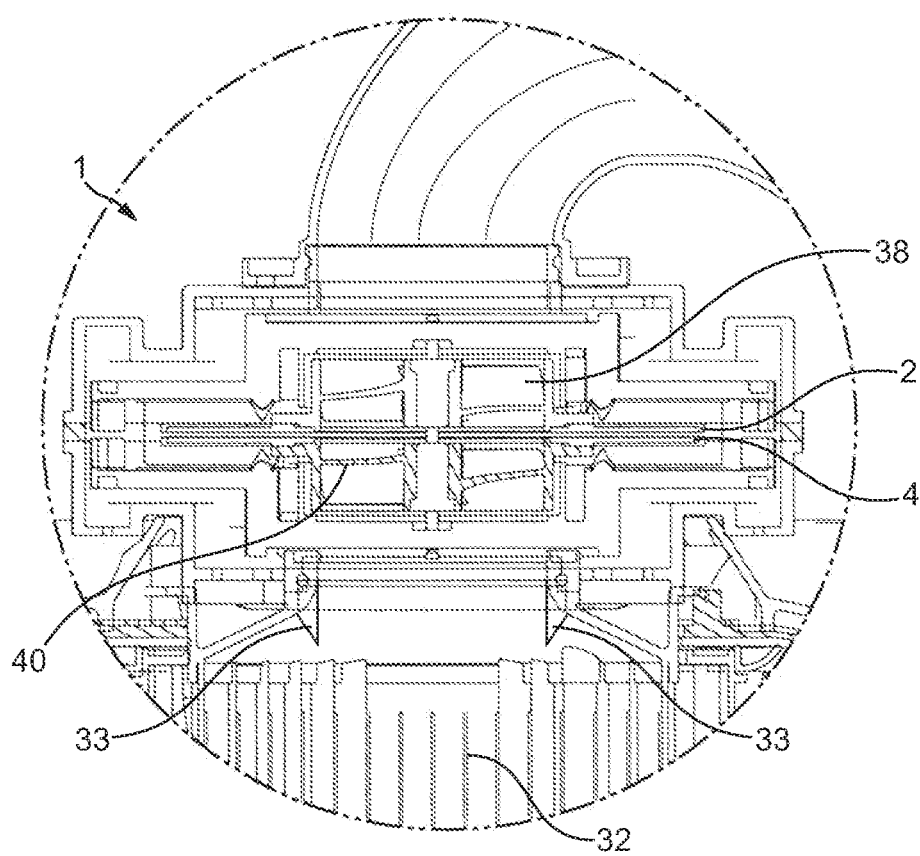
FIG. 2b shows a close up of the circled area shown in FIG. 2a, FIG. 3a shows a perspective view of an electrical influence machine according to the present invention.

As can be seen in FIGS. 2a and 2b the surface treating appliance in this embodiment of the invention is a vacuum cleaner 30. The vacuum cleaner 30 is a cylinder vacuum cleaner but it could alternatively be an upright, stick vac or handheld vacuum cleaner.

The vacuum cleaner 30 shown in FIGS. 2a and 2b comprises an electrical influence machine indicated generally at 1.

The vacuum cleaner 30 can also be seen to comprise an electrostatic filter 32. The electrical influence machine 1 is electrically connected to the electrostatic filter 32 such that during use of the vacuum cleaner 30, power generated by the electrical influence machine 1 can be passed to the electrostatic filter 32. The electrical influence machine 1 can also generate ozone and may therefore be used as an ozone generator in combination with the electrostatic filter 32 or on its own. Alternatively the electrical influence machine 1 may be connected to a separate ozone generator for example corona discharge points 33 in order to increase the amount of ozone generated.

The vacuum cleaner 30 can also be seen to comprise a single upstream cyclonic separator 34 and a plurality of downstream cyclones 36 which are arranged in parallel in terms of airflow through the cyclones 36. The electrical influence machine 1 is arranged in the airflow path of the vacuum cleaner 30 such that air exiting the plurality of downstream cyclones 36 will pass through the electrical influence machine 1.

FIGS. 3a to 3g show an embodiment of electrical influence machine 1 according to the present invention in more detail. The electrical influence machine 1 can be seen to comprise a first non electrically conductive support structure in the form of a first disk 2, spaced from a second non electrically conductive support structure, in the form of a second disk 4. In the embodiment shown in FIGS. 3a to 3g the disks 2, 4 are spaced from each other by a distance 0.75 mm. It should be noted that, in general, a small a spacing as possible between the disks is advantageous in terms of induction of charge between the conductive sectors of the disks. However, in practice the dimension of the gap is limited by mechanical constraints such as the 'wobble' of the disks as they rotate.

The electrical influence machine 1 can also be seen to comprise a pair of turbines which are arranged to contra rotate the disks 2, 4 as the vacuum cleaner's 30 airflow passes through the turbines during use of the vacuum cleaner 30. A first turbine 38 is associated with the first disk 2 and a second turbine 40 is associated with the second disk 4. The turbines 38, 40 can be seen best in the exploded diagram in FIG. 3c. Airflow passing through the turbines 38, 40 in the direction of arrow C will cause the first turbine 38 to spin the first disk 2 in an anticlockwise direction and the second turbine 40 will cause the second disk 4 to spin in a clockwise direction. The disks 2, 4 in the embodiment shown are arranged to rotate at the same speed. The actual speed will vary but at full power the disks preferably rotate at or near 4000 RPM.

Four charge collecting points 16, 18, 20, 22 are arranged such that they can collect charge built up when the disks 2, 4 rotate during use. In the embodiment shown the charge collecting points 16, 18, 20, 22 comprise conductive points spaced from the disks 2, 4 by a distance of 0.01 to 5 mm, although in general a small spacing is preferred since this maximises the efficiency of charge transfer between the conductive sectors and the charge collecting points by electrical discharge. The charge collecting points 16, 18, 20, 22 can be seen best in FIGS. 3b, 3c, 3e and 3f. During use of the vacuum cleaner 30 the disks 2, 4 spin and charge is built up on the disks 2, 4. This charge passes from the disks 2, 4 to the charge collecting points 16, 18, 20, 22 by electrical discharge. First and second charge collecting points 16, 18 collect negative and positive charges from the first disk 2 and third and fourth charge collecting points 20, 22 collect negative and positive charges from the second disk 4.

Figure 3A:
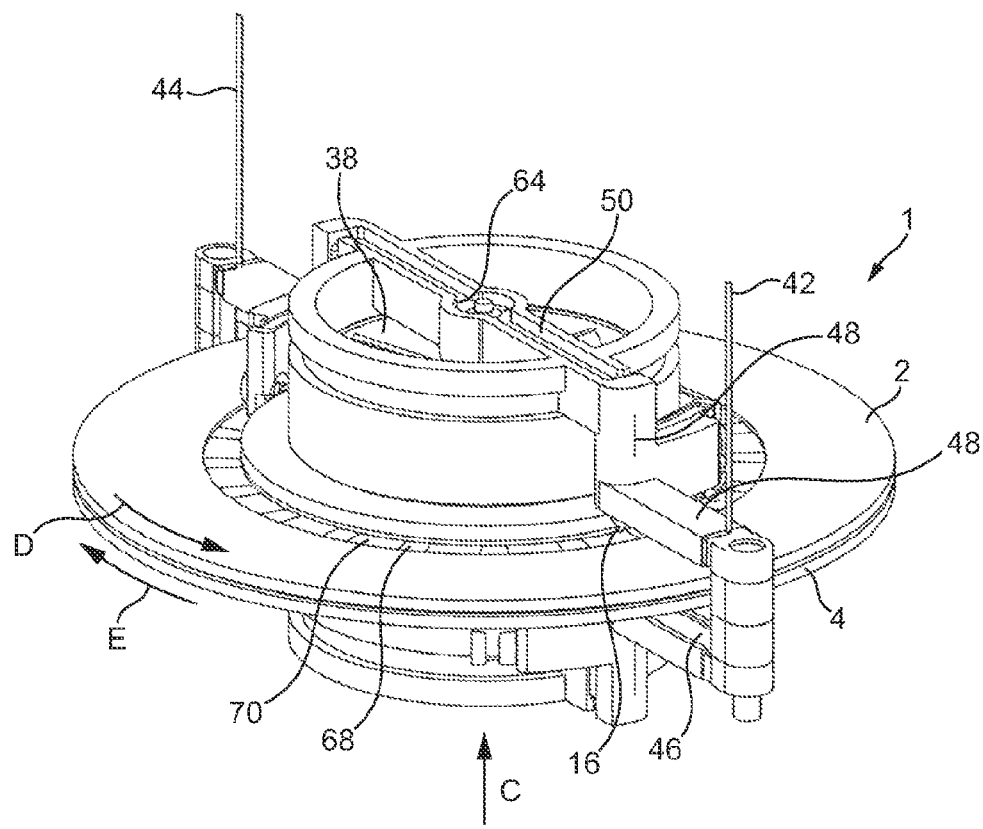
FIG. 3b shows a side view of the electrical influence machine shown in FIG. 3a, FIG. 3c shows an exploded view of the electrical influence machine shown in FIGS. 3a and 3b.
FIG. 3d shows a second perspective view of the electrical influence machine shown in FIGS. 3a to 3c.
FIG. 3e shows a close up of a charge collecting point and a neutralizing brush shown in FIG. 3d.
FIG. 3f shows a stripped down version of the electrical influence machine shown in FIGS. 3a to 3e showing the conductive parts in more detail.
FIG. 3g shows a plan view of the electrical influence machine shown in FIGS. 3a to 3f.
Figure 3B:
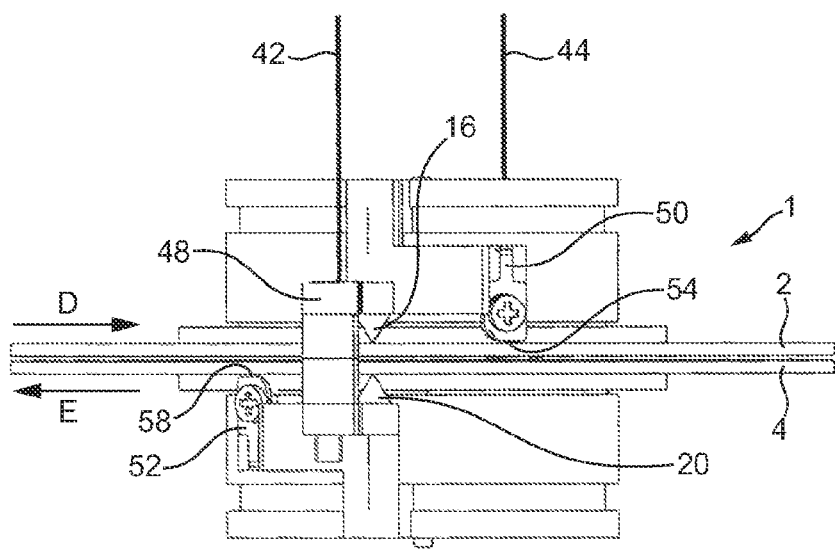
Figure 3C:
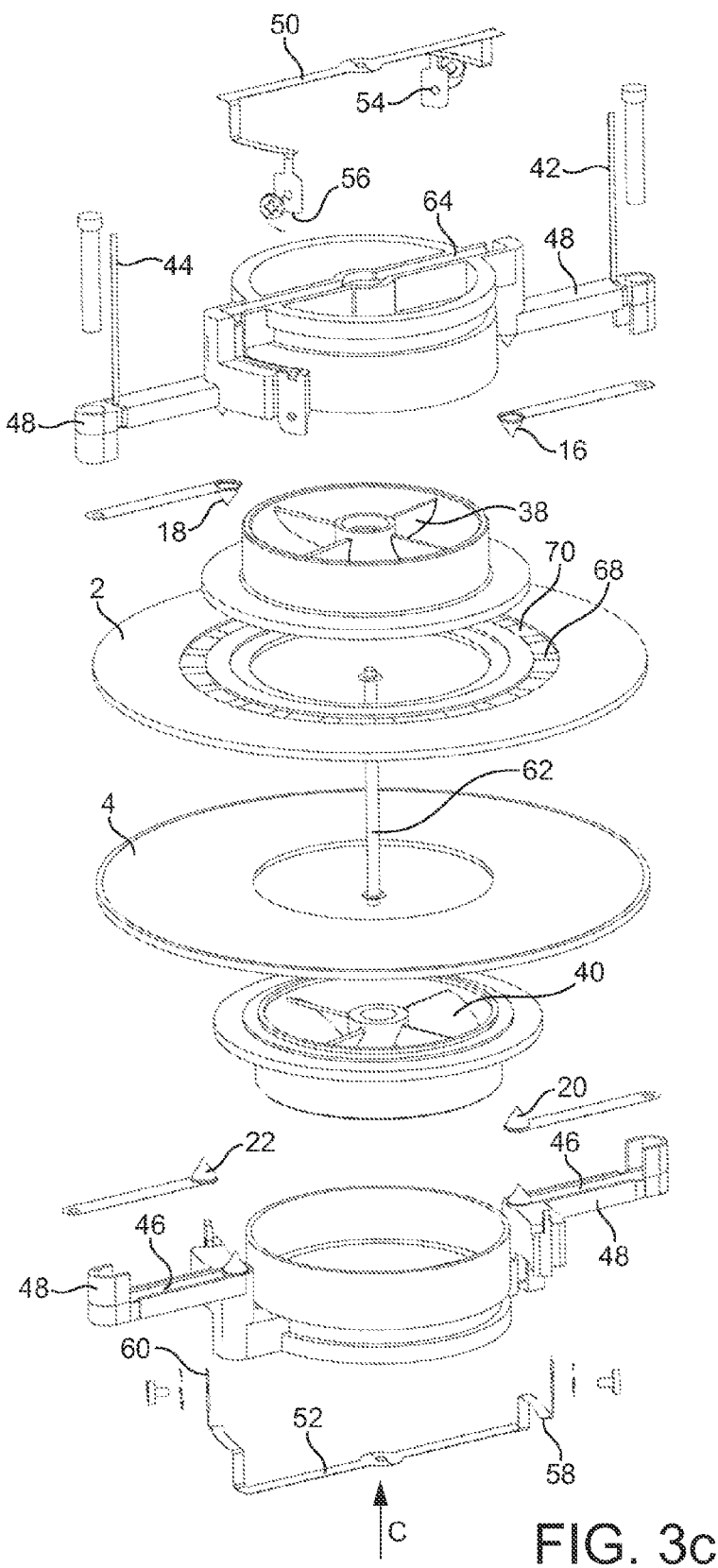
Figure 3D:
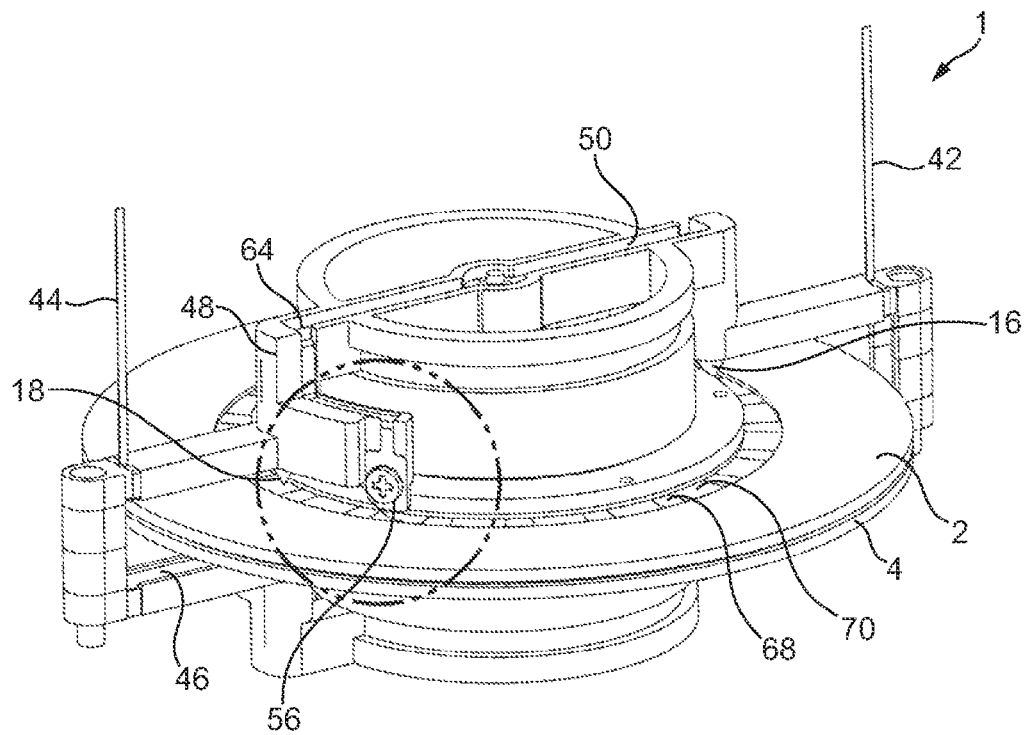
Figure 3E:
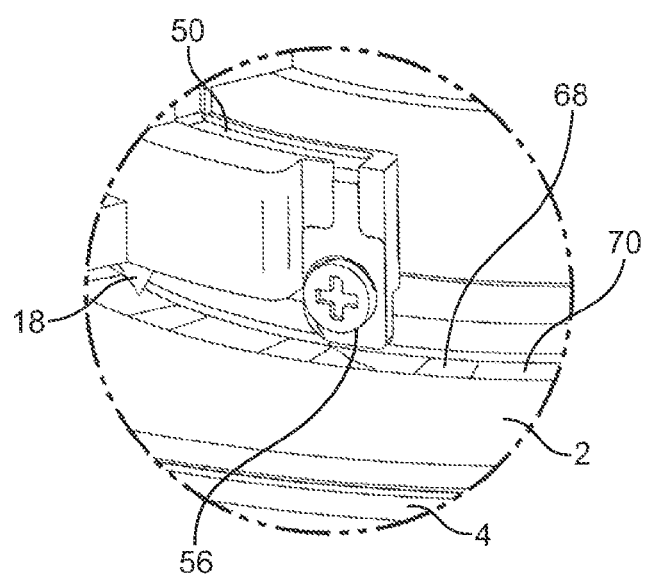
Figure 3F:
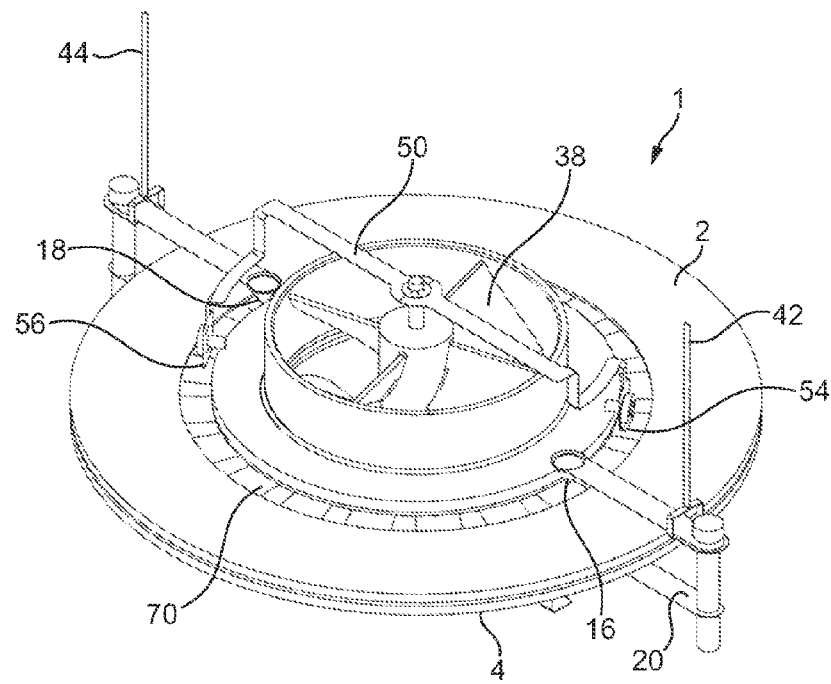
Figure 3G:
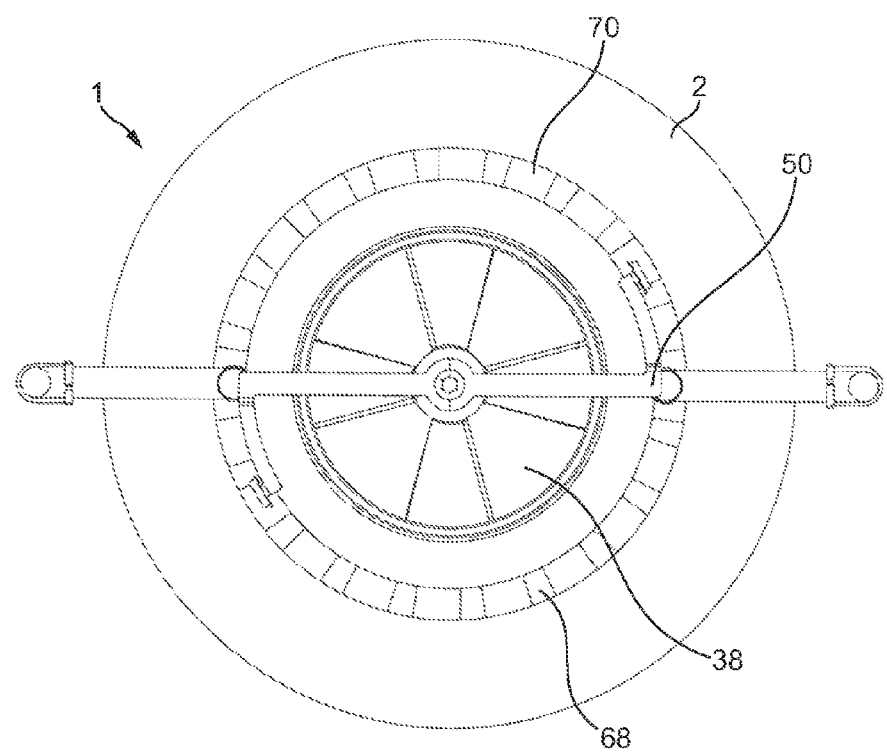

The first and third charge collecting points 16, 20 are electrically connected to each other and to a first high voltage output point 42. The second and fourth charge collecting points 18, 22 are electrically connected to each other and to a second high voltage output point 44. This connection can be seen best in FIG. 3f. The electrical connection between the charge collecting points and the high voltage output points may be in the form of a conductive material, such as a copper track, as shown in FIG. 3f or alternately it can be in the form of a conductive paint or ink which can be located in a first high voltage track 46 located on an electrical support scaffold 48.

The first and third charge collecting points 16, 20 are arranged opposite each other such that during use they draw the same charge, either negative or positive, from opposed portions on the first and second disks 2, 4. The second and fourth charge collecting points 18, 22 are arranged at 180 degrees from the first and third charge collecting points 16, 20. The second and fourth charge collecting points 18, 22 are arranged opposite each other such that during use they draw the same charge as each other but the opposite charge to the charge drawn by the first and third charge collecting points 16, 20. For example, if the first and third charge collecting points 16, 20 are drawing a negative charge from the disks 2, 4 then the second and fourth charge collecting points 18, 22 will be drawing a positive charge.

The electrical influence machine 1 also further comprises a first electrically conductive neutralizing rod 50 and a second electrically conductive neutralizing rod 52. The first neutralizing rod 50 takes the form of a yoke which is mounted at the rotational axis of the disks 2, 4, each end of the yoke having downwardly depending electrical contact portions, hereafter referred to as a first end 54 and a second end 56 which are electrically connected together via the yoke. The second neutralizing rod 52 has the same general yoke-like structure of the first neutralizing rod, has a first end 58 and a second end 60, but is mounted on the opposite face of the electrical influence machine 1 to the first neutralizing rod 50. The first and second ends 54, 56 of the first electrically conducting neutralizing rod 50 are in contact with the top surface of the first disk 2 and the first and second ends 58, 60 of the second electrically conductive neutralizing rod 52 are in contact with the lower surface of the second disk 4. The first and second neutralizing rods 50, 52 are also in electrical contact with each other through support rod 62.

The first and second neutralizing rods 50, 52 are offset from each other. This can be seen best in FIG. 3b where it can be seen that the first end 54 of the first neutralizing rod 50 is offset from the first end 58 of the second neutralizing rod 52. The ends 54, 56, 58, 60 of the neutralizing rods 50, 52 are in the form of combs or brushes which are arranged to contact the disks 2, 4.

If the disks 2, 4 spin in the direction of the arrows D, E then the first end 54 of the first electrically conductive neutralizing rod 50 is arranged after the first charge collecting point 16 in the direction of travel. The second end 56 of the first electrically conductive neutralizing rod 50 is arranged after the second charge collecting point 18 in the direction of travel. The first end 58 of the second electrically conductive neutralizing rod 52 is arranged after the third charge collecting point 20 in the direction of travel. The second end 60 of the second electrically conductive neutralizing rod 52 is arranged after the fourth charge collecting point 22 in the direction of travel.

Both of the neutralizing rods 50, 52 are formed from a conductive material which is supported on the electrical support scaffold 48. Alternatively a conductive paint may be applied to a second high voltage support track 64 on the electrical support scaffold 48 to electrically connect the first 54, 58 and second 56, 60 ends of the neutralizing rods 50, 52 and the first neutralizing rod 50 to the second neutralizing rod 52.

An embodiment showing one of the disks 2, 4 in more detail is shown in FIGS. 4a to 4d. The disks 2, 4 are formed from an electrically non conductive material, for example glass, rubber or a plastics material such as an acrylic polymer.

A plurality of electrically conductive sectors 66 are embedded in the non conductive (i.e. electrically insulating) material such that the sectors 66 are electrically isolated from one another by the non conductive material. An exposed portion 68 of each sector 66 is not coated in the non electrically conductive material. These exposed areas 68 are positioned at a radially inward part of the disk and can be seen located in the track 70 shown in FIGS. 3a and 3c to 3g. The charge collecting points 16, 18, 20, 22 are arranged such that they are located in line with this track 70 so that they can collect charge from the exposed portion 68 of each sector 66. The first 54, 58 and second 56, 60 ends of the neutralizing rods 50, 52 are also arranged such that they are located in line with this track 70 so that they contact the exposed portions 68 of each sector in turn as the disks 2, 4 rotate. The track 70 may be arranged in a fluid, vacuum, mist, gas or mixture of any of these.

In a particular embodiment, for example in an electrical influence machine 1 where the track is exposed to air and is designed to develop 5 Kv across an electrostatic filter it is desirable that the exposed portions 68 are no more than 0.018 times the circumference of the track 70 and/or are no closer than 5.6 mm to their neighbouring sector. This advantageously helps to ensure that the exposed portions 68 do not discharge to each other. For example with a track 70 that is 60 mm in diameter, with a disk containing 20 sectors it is desirable that the exposed portions 68 are no greater than 3.4 mm. With an 80 mm diameter track 70 it would be desirable for the exposed portions to be no greater than 4.9 mm.

The exposed portions 68 in the embodiment shown are the inner portions of the sectors 66. The exposed portion may however be any exposed part of the sector. The track 70 in which the exposed portions 68 lie is positioned on the outer surface of each of the disks 2, 4.

In the electrical influence machine 1 the electrically conductive sectors 66 are positioned close to opposing inner surfaces of the disks 2, 4. The electrically conductive sectors 66 are coated on both sides with a layer of the electrically non conductive material 67 which is approximately 1 mm in this embodiment, although the layer may be from 0.5 to 300 mm thick, depending on the scale of the device.

The electrically non conductive material is preferably a transparent acrylic polymer so that the conductive sectors 66 can be seen through the polymer. In the embodiment shown in FIG. 4a the disk 2, 4 has 20 sectors. It is possible for the disks to have more or less sectors 66 but it is preferable that the first and second disks 2, 4 have the same number of sectors 66 and that there are an even number of sectors 66.

Figure 4A:
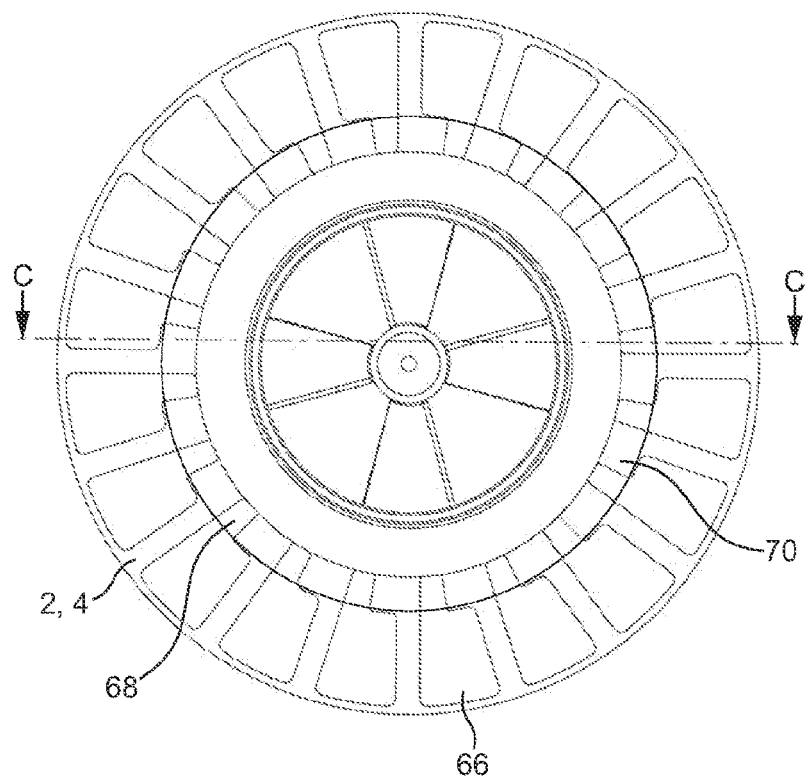
FIG. 4a shows a plan view of one of the support structures of the electrical influence machine.
Figure 4B:
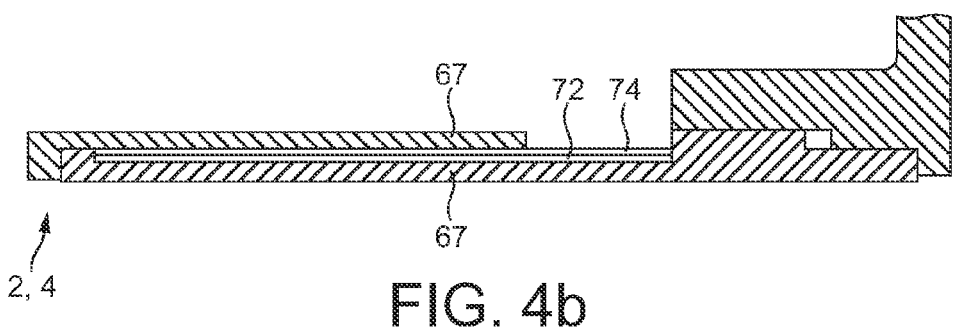
FIG. 4b shows a section through a portion of the support structure shown in FIG. 4a, FIG. 4c shows an electron micrograph of a portion of a conductive sector according to the present invention.

FIG. 4b shows a section through one of the disks 2, 4. The conductive sectors 66 preferably comprise an activated carbon layer 72 and a layer of copper 74. The conductive sectors 66 are coated in the acrylic polymer to form the disk 2, 4. In this embodiment the sectors 66 are formed by spraying or painting activated carbon 72 directly onto a copper coated polyester mesh layer 74. Preferably the mesh is a non woven mesh. Spraying or painting a copper powder, paint or dispersion onto a mesh effectively forms a metallic fabric 74 to which the activated carbon 72 can be applied.

Figure 4C:
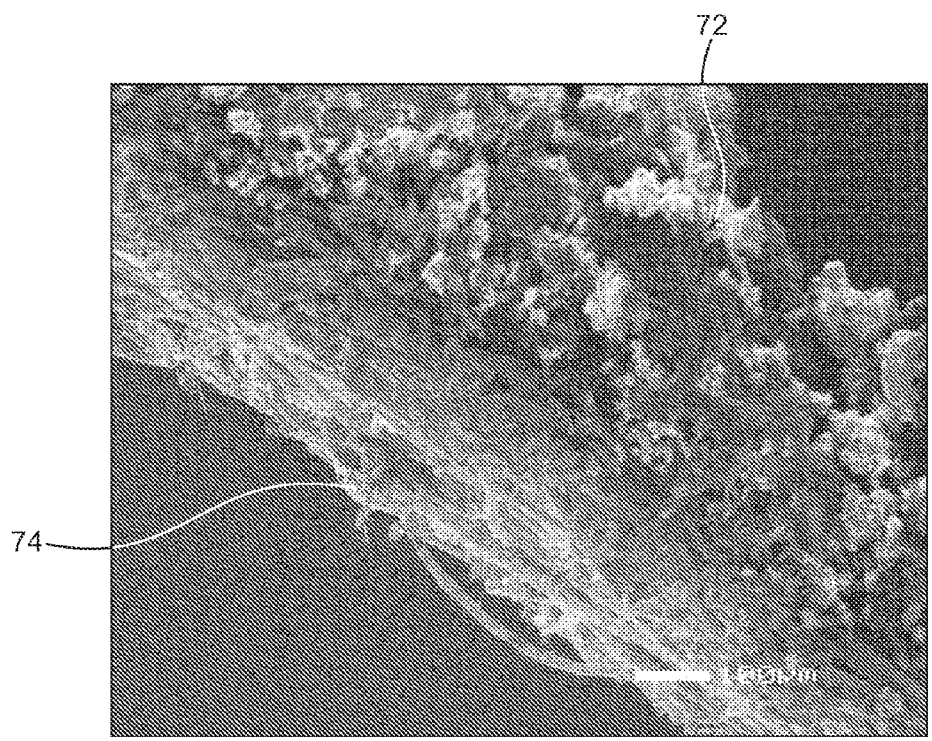
FIG. 4d shows a close up of the electron microscope image shown in FIG. 4c.
Figure 4D:
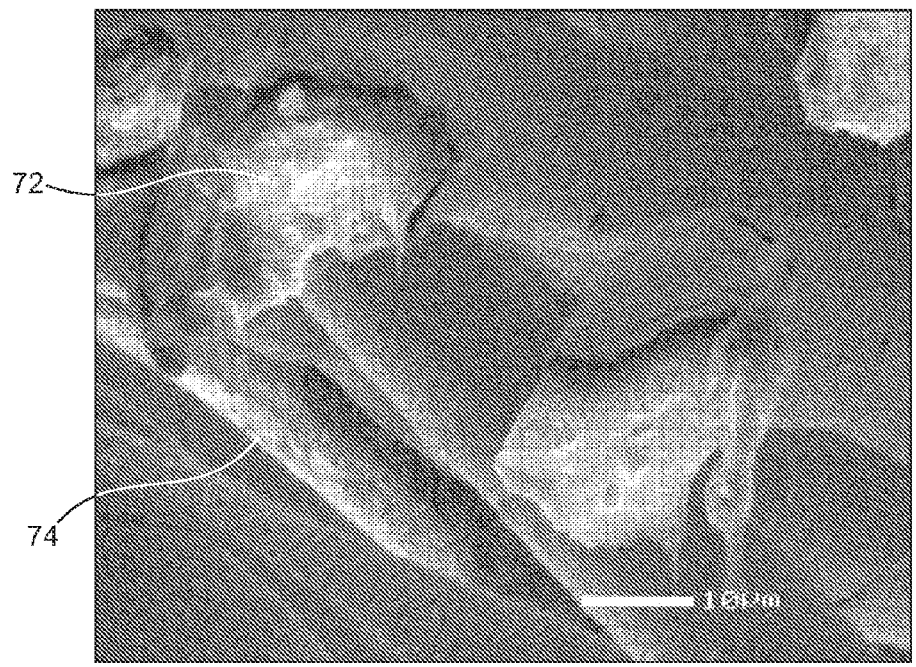

FIG. 4c shows an electron micrograph of a section through a portion of such a sector 66. FIG. 4d shows a close up of some activated carbon particles 72 attached to the surface of the copper fabric 74.

Figure 5:
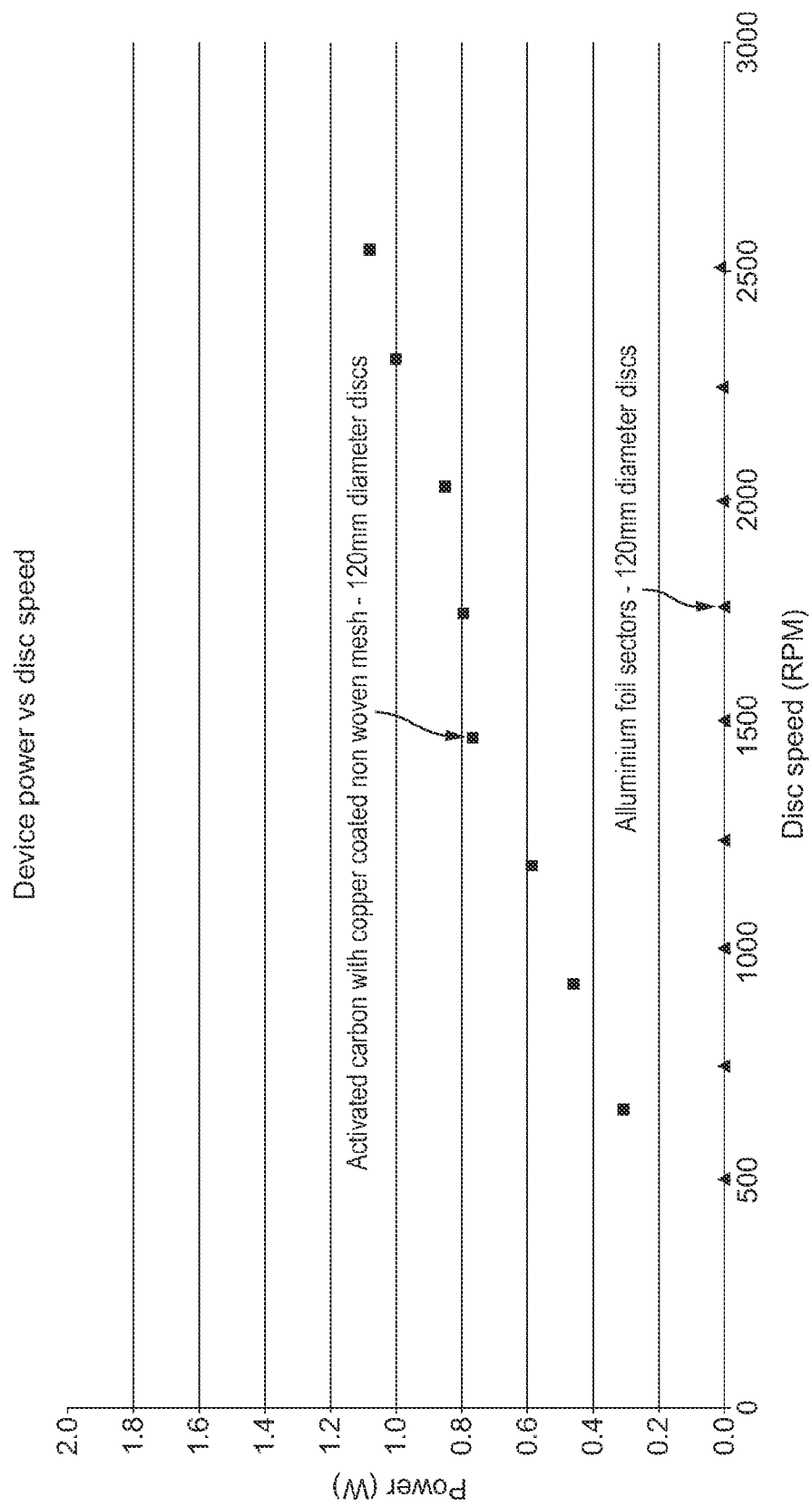
FIG. 5 shows a graph of the power output from the electrical influence machine in Watts verses disk speed in revolutions per minute (RPM)
Figure 6:
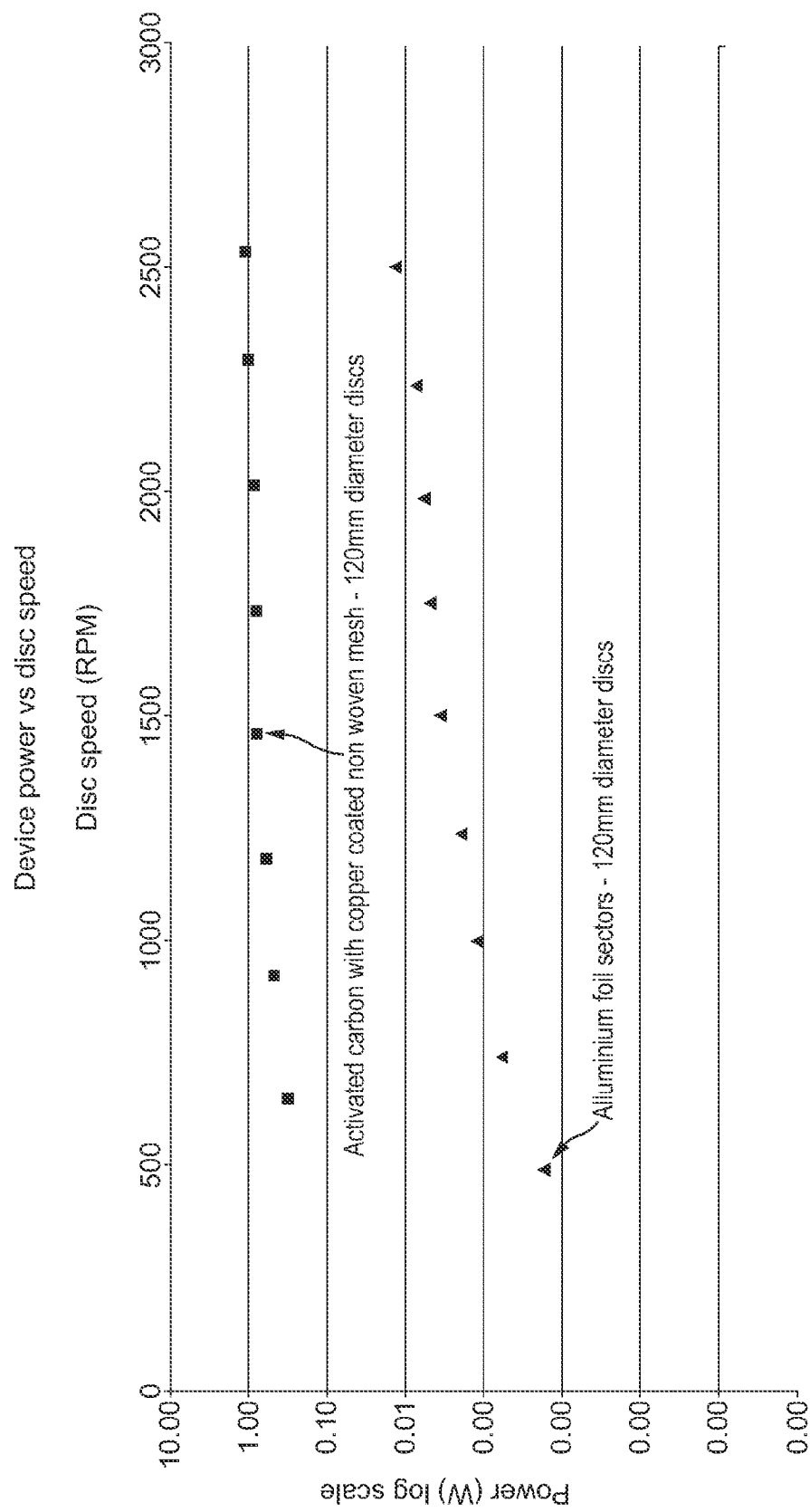
FIG. 6 shows the same data as in the graph shown in FIG. 5 but the Power output is shown using a Log scale.

FIGS. 5 and 6 show graphs comparing the power output generated by an electrical influence machine having aluminium foil sectors (as has been used in prior art electrical influence machines) with sectors formed using activated carbon/copper. See Tables 1 and 2 at the end of the description for the data used to generate the graphs.

FIG. 5 shows the power output from the electrical influence machine in Watts verses disk speed in revolutions per minute (RPM). FIG. 6 shows the same data but the power output is shown using a Log scale. Both data sets have been generated using disks which are 120 mm in diameter. The electrical influence machine was run at 22° C. at 40% relative humidity.

It can be seen that the aluminium foil sectors produce very little power compared to the activated carbon/copper sectors. In both graphs a 2D sector area (i.e. geometric/macroscopic surface area that can be discerned by the naked eye) of 396 mm$^2$ has been used for both the aluminium foil and the activated carbon/copper. In FIG. 5 it can be seen that at the lowest speeds the aluminium foil sectors are only producing 0.0001740 Watts of power output whereas the activated carbon/copper sectors are producing 0.310830 Watts of power. This means that at the lowest speeds the activated carbon/copper sectors produce more than 1786 times as much power as the aluminium foil sectors.

At the highest speeds shown in FIGS. 5 and 6 the aluminium foil sectors were found to produce almost 0.0135946 Watts of power whilst the activated carbon/copper sectors produced 1.080300 Watts of power. This means that even at the higher speeds the activated carbon/copper sectors produce more than 79 times as much power as the aluminium foil sectors.

Figure 7:
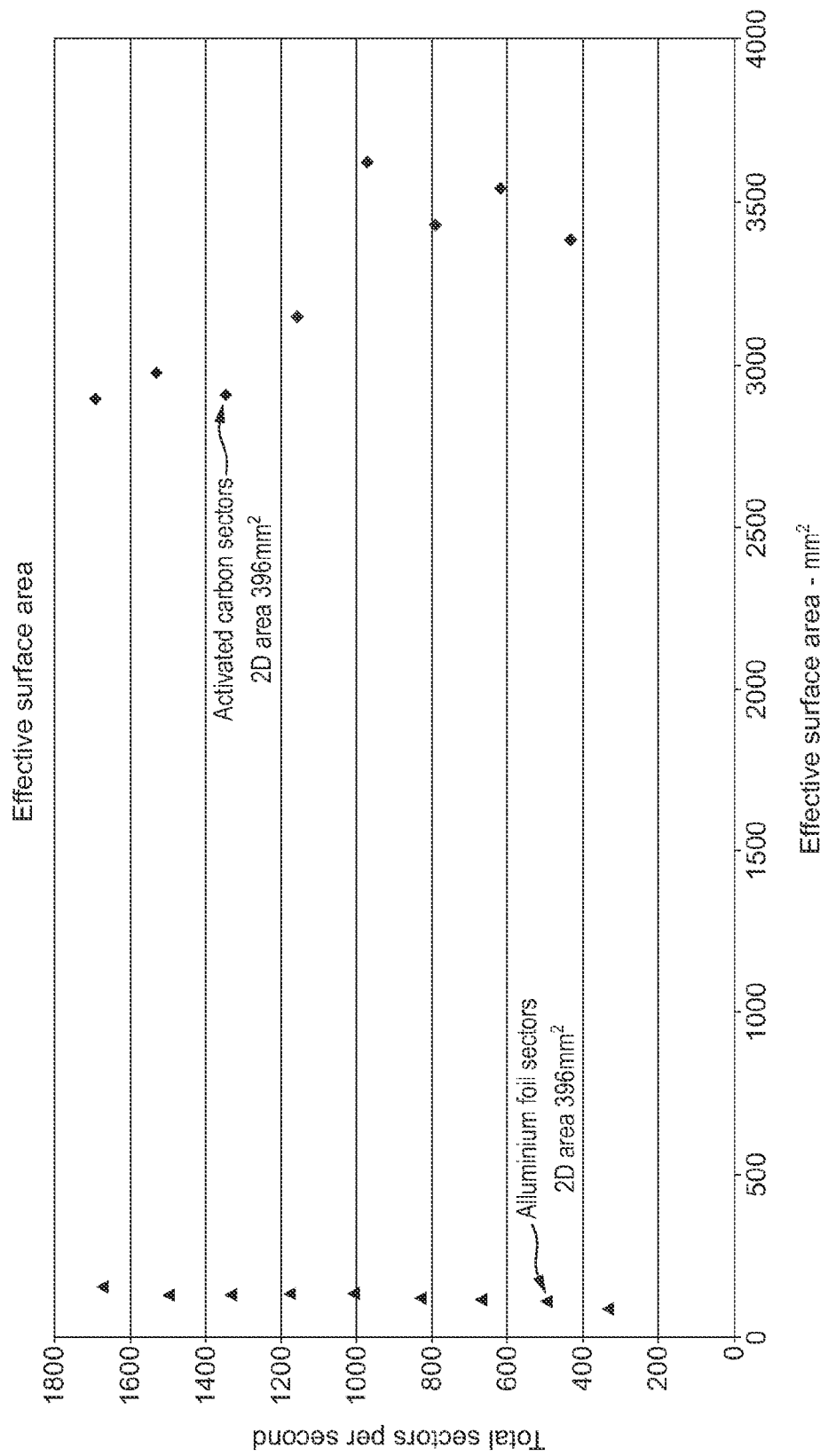
FIG. 7 shows a graph of effective surface area verses total sectors per second.

FIG. 7 shows the effective surface area of the sectors compared to the total number of sectors which pass the charge collector points per second. See Tables 1 and 2 at the end of the description for the data used to generate the graph. The effective surface area is the surface area of material on the sector that we believe is actively involved in the generation and output of power from the sectors. The effective surface area is therefore not necessarily the same area as the 2D area of the sectors or the same as the specific surface area of the material from which the sector is made.

Without wanting to be bound by theory we believe that we have discovered that we can calculate the effective surface area of the sectors using the following information and formulas.

We believe that the maximum charge density that a sector can transport limits the maximum output current from the electrical influence machine. Therefore we believe that the larger the sector area and the larger the charge density the higher the produced current will be (hence more power).

Therefore the charge density (p) multiplied by the amount of area (A) passing in 1 second is we believe the maximum current the device is able to produce. This relationship can be expressed by the following formula Charge per second=pA where p is the charge density and A is the area of charge carrier transferred per second, with the result being expresses in Coulombs per Second or Amps The maximum charge density (p) can be calculated using Gauss' theorem (p=$\epsilon_0$ E) using the maximum electric field perpendicular to the sectors (E) and the permittivity of free space ($\epsilon_0$). Permittivity of free space ($\epsilon_0$) relates units of electrical charge with that of mechanical quantities. This is a constant and equates to $\epsilon_0$=8.85×10-12 F/m.

The maximum electric field perpendicular to our sectors (E) is equal to the ionisation voltage in air. We believe that the sectors cannot sustain a field any greater than the ionisation voltage. This is because the sectors are exposed to the air and it leads to charge leakage through ionisation. If the device was operated in a true vacuum, mist or fluid we believe we could sustain a larger electric field. The electric field strength at normal temperatures and at sea level is E=3×10$^6$ V/m.

Using the above constants the maximum charge density for our device is p=$\epsilon_0$ E $$p=8.85\times10\text{-}12 \text{ F/m}\times3\times106 \text{ V/m}.$$

$$p=26.55 \text{ }\mu\text{C/m2}.$$

Therefore if the disc speed is known we believe that we can calculate the maximum theoretical output current of the electrical influence machine. We also therefore believe that if we know the output current and the disc speed we can calculate the theoretical or effective surface area of the sectors.

FIG. 7 shows that the effective surface area is very low in the aluminium foil sectors. This equates to the low power output seen in FIGS. 5 and 6. The effective surface area which is generating charge on the activated carbon/copper sectors can be seen to be much higher. This is believed to account for the higher power output seen for the activated carbon/copper sectors.

Figure 8:
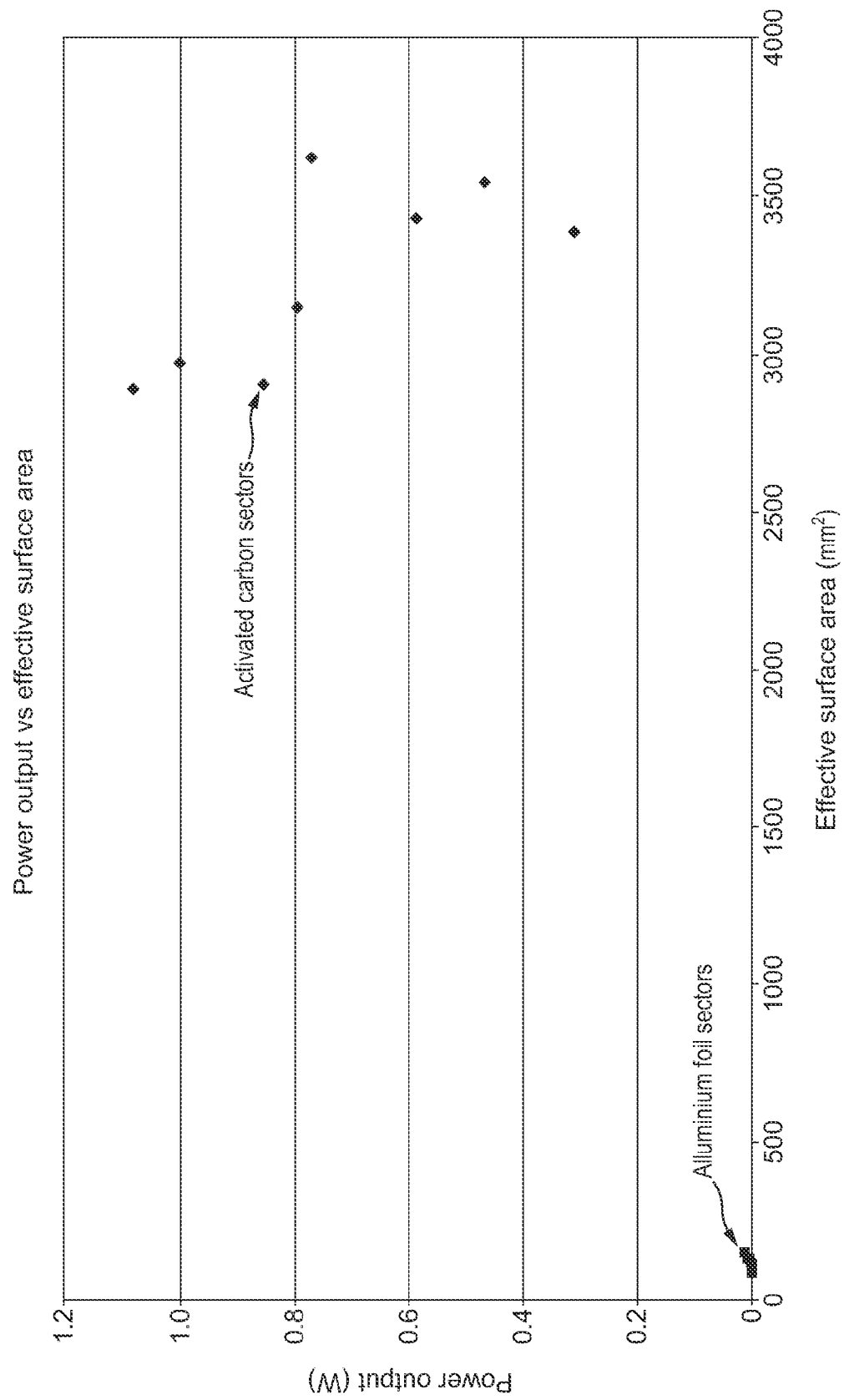
FIG. 8 shows a graph of power output of the electrical influence machine versus the effective surface area.

FIG. 8 shows the power output of the electrical influence machine versus the effective sector area. See Tables 1 and 2 at the end of the description for the data used to generate the graph.

From FIGS. 7 and 8 it is interesting to note that for the activated carbon/copper sectors the higher the number of sectors which pass the collecting points per second the lower the amount of effective surface area is involved in producing the power output. This is believed to account for why the power output at the higher revolutions is only approximately 79 times as much for the activated carbon/copper sectors over the aluminium sectors whereas at the lower revolutions the power output is 1786 times as much. Although we do not want to be bound by theory we believe that this effect may be because at the higher speeds although a higher charge is built up on the activated carbon/copper sectors, there is not enough time to remove the charge through the collecting points.

It is important to note that the "effective surface area" is not the same as the total surface area (sometimes known as the specific surface area) of the activated carbon or aluminium, but is believed to be the surface area on which charge builds up and can be collected. Again although we do not wish to be bound by theory we believe that for the activated carbon/copper sectors this effective surface area may equate to the surface area of activated carbon which is in contact with the copper layer. Any way of increasing the specific surface area of carbon which contacts the copper backing would therefore be desirable as it has the effect of increasing the effective surface area involved in the charge generation and transfer process.

Figure 9:
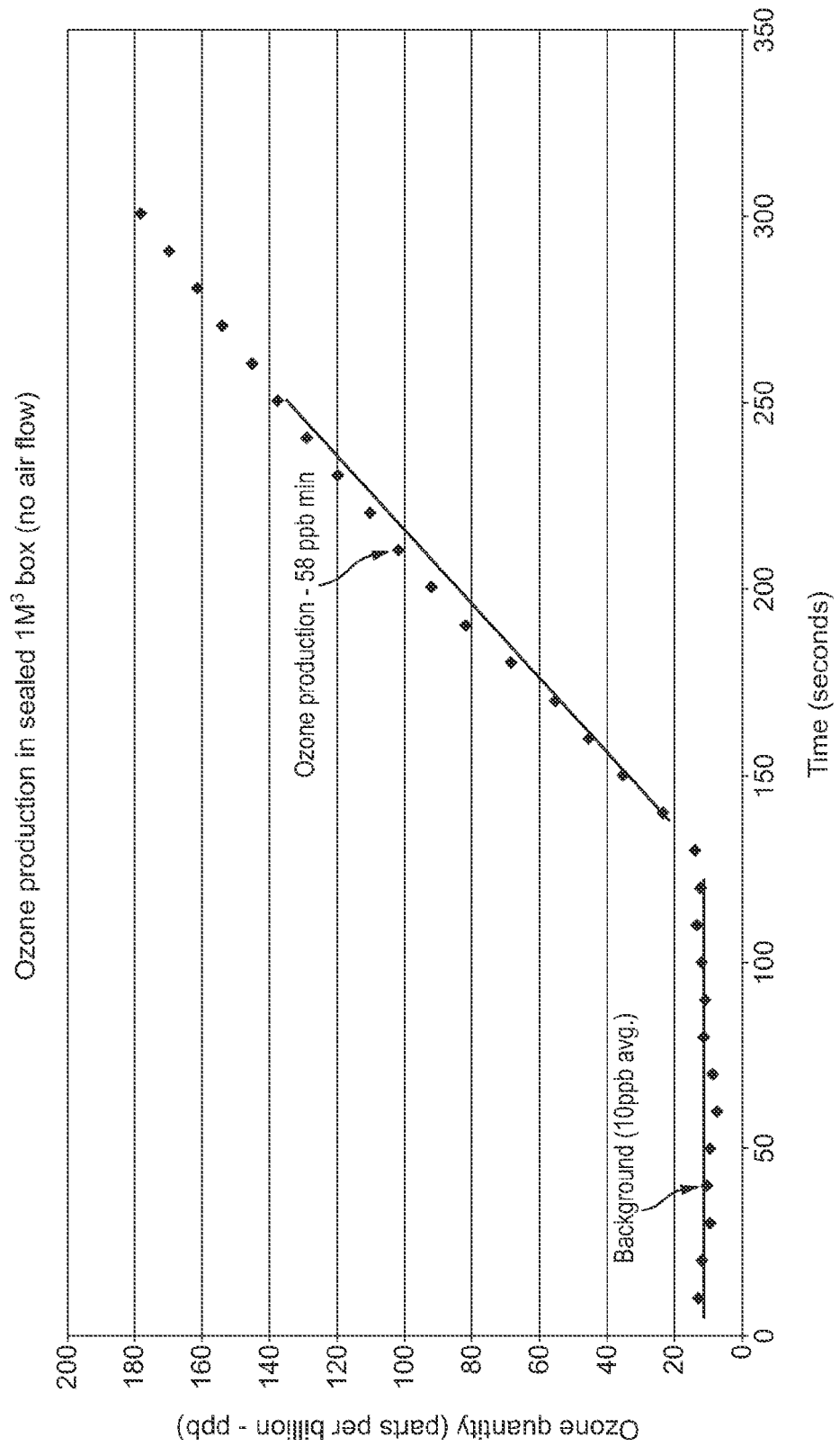
FIG. 9 shows a graph of ozone production in a sealed 1 $m^3$ box.

As discussed earlier the electrical influence machine may be utilised as an ozone generator. FIG. 9 shows a graph of ozone production in a sealed 1 $m^3$ box with no airflow. The disks used were 120 mm in diameter and the 2D sector area of the conductive sectors was 396 $mm^2$. The electrical influence machine was run at 22° C. at 40% relative humidity. From the graph it can be seen that the electrical influence machine generated ozone at a rate of 58 parts per billion per minute in the sealed chamber.

Below are the tables containing the data used to generate the graphs in FIGS. 5 to 8.

TABLE 1

Activated Carbon Sectors with 120 mm diameter discs. Sectors have a 2d surface area of 396 $mm^2$ and are made with 1 layer of copper coated polyester cloth with activated carbon powder. Device tested at 22° C. at 40% relative humidity. Output voltage and output current measured when connected to an electrostatic filter.

| Single Disc Speed (RPM) | Vout (Kv) | Iout (uA) | Power (W) | Watts per revolution (W rev) | Area of charge per second ($M^2$) | Number of sectors per second | Effective Surface Area ($mm^2$) |
|---|---|---|---|---|---|---|---|
| 651 | 7.97 | 39 | 0.310830 | 2.39E−04 | 1.4689 | 434 | 3385 |
| 925 | 8.03 | 58 | 0.465740 | 2.52E−04 | 2.1846 | 617 | 3543 |
| 1186 | 8.14 | 72 | 0.586080 | 2.47E−04 | 2.7119 | 791 | 3430 |
| 1467 | 8.17 | 94 | 0.767980 | 2.62E−04 | 3.5405 | 978 | 3620 |
| 1741 | 8.21 | 97 | 0.796370 | 2.29E−04 | 3.6535 | 1161 | 3148 |
| 2021 | 8.2 | 104 | 0.852800 | 2.11E−04 | 3.9171 | 1347 | 2907 |
| 2298 | 8.27 | 121 | 1.000670 | 2.18E−04 | 4.5574 | 1532 | 2975 |
| 2538 | 8.31 | 130 | 1.080300 | 2.13E−04 | 4.8964 | 1692 | 2894 |

TABLE 2

Aluminium Foil Sectors with 120 mm diameter discs. Sectors have a 2d surface area of 396 $mm^2$. Device tested at 22° C. at 40% relative humidity. Output voltage and output current measured when connected to an electrostatic filter.

| Single Disc Speed (RPM) | Vout (Kv) | Iout (uA) | Power (W) | Watts per revolution (W rev) | Area of charge per second ($M^2$) | Number of sectors per second | Effective Surface Area ($mm^2$) |
|---|---|---|---|---|---|---|---|
| 501 | 0.229 | 0.76 | 0.0001740 | 3.47385E−07 | 0.0286 | 334 | 86 |
| 750 | 0.428 | 1.43 | 0.0006120 | 8.16053E−07 | 0.0539 | 500 | 108 |
| 1008 | 0.607 | 2.02 | 0.0012261 | 1.21641E−06 | 0.0761 | 672 | 113 |
| 1247 | 0.776 | 2.59 | 0.0020098 | 1.61174E−06 | 0.0976 | 831 | 117 |
| 1513 | 1.054 | 3.51 | 0.0036995 | 2.44517E−06 | 0.1322 | 1009 | 131 |
| 1764 | 1.23 | 4.1 | 0.0050430 | 2.85884E−06 | 0.1544 | 1176 | 131 |
| 1997 | 1.346 | 4.49 | 0.0060435 | 3.02631E−06 | 0.1691 | 1331 | 127 |
| 2246 | 1.51 | 5.03 | 0.0075953 | 3.3817E−06 | 0.1895 | 1497 | 127 |
| 2509 | 2.02 | 6.73 | 0.0135946 | 5.41833E−06 | 0.2535 | 1673 | 152 |

The skilled person will appreciate that various modifications could be made to the electrical influence machine 1 described above with reference to FIGS. 1 to 9, without departing from the scope of the invention as defined by the appended claims.

For example, although the machine described above consist of two disks 2, 4 that rotate in opposite directions, it is also possible for the machine to have a single rotatable disk. Such a variant is shown in FIGS. 10a, 10b, 11, 12 and 13 and is described in more detail below.

An electrical influence machine, or device, 100 in accordance with an alternative embodiment of the invention is similar to that of the first embodiment, the principle distinction being that it includes only a single rotatable disk.

The machine 100 comprises a relatively shallow open cup-shaped housing 102 having an aperture or hub 104 at its centre for receiving a drive spindle or shaft 106. The housing 102 has a peripheral wall that defines a recess 108 within which is received a first support disk 110 that is fixed so that it remains stationary with respect to the housing 102. A second support disk 112 is located adjacent the first support disk 110 and is mounted so that it is rotatable relative to the housing 102 and, therefore, the first disk 110.

The first support disk 110 is circular so that its profile corresponds generally to that of the housing 102 and is made from an insulating substrate into which first and second conductive segments 114 are embedded. It should be noted, however, that the conductive segments 114 are shown spaced from the lower support disk 110 in the exploded view in FIGS. 10a and 10b for clarity. The lower support disk 110 is received in the housing recess 108 and is secured to it by a suitable bonding technique, for example gluing with a suitable plastics-compatible epoxy, so that it is fixed within the housing 102 and cannot rotate.

The second support disk 112 is also formed from an insulating material, such as polyurethane, and includes a plurality (nine in this example) of conductive sectors 116 embedded therein in a similar manner to the first embodiment of the invention. Again, it is to be noted that the conductive sectors 116 are shown spaced from the second support disk 112 in FIGS. 10a and 10b for clarity.

An underside face 118 of the second support disk 112 includes a radial trough or track 120, the purpose of which is to expose portions of the conductive sectors 116 so that accumulated charge may be removed from them in the same way as in the first embodiment of the invention. The diameter of the track 120 is greater than the diameter of the stationary disk 110 so permit access to the track 120, as will be described further below. The precise configuration of the conductive sectors 116 is the same as in the first embodiment of the invention so further description will be omitted.

The second support disk 112 is received with the housing 102 so that it is located close to but spaced from the first support disk 110. The drive spindle 106 is received through the aperture 104 in the housing 102, and a co-axial aperture 122 in the first support disk 110 and is secured into a central bore 124 in the second support disk 112. In this way, the spindle 106 drives rotation of the second support disk 112. The spindle 106 also carries a bearing 126 which sits in the aperture 104 and functions to hold the spindle 106 in a set axial position so that the upper disk 112 remains spaced a predetermined distance from the lower disk 102.

Each of the conductive segments 114 includes an outwardly facing tab 128 to which is connected a charge collecting point 130 in the form of a wire brush. The tabs 128 are positioned so that they are in line and underneath the radial track 120 of the upper disk 112. In this way, the charge collection brushes 130 extend into the track 120 and make electrical contact with the exposed portions of the conductive sectors 116 as the upper disk rotates and so collect charge that has been induced in those sectors in the same way as the charge collecting points 16, 28, 20, 22 of the first embodiment.

Figure 10A:
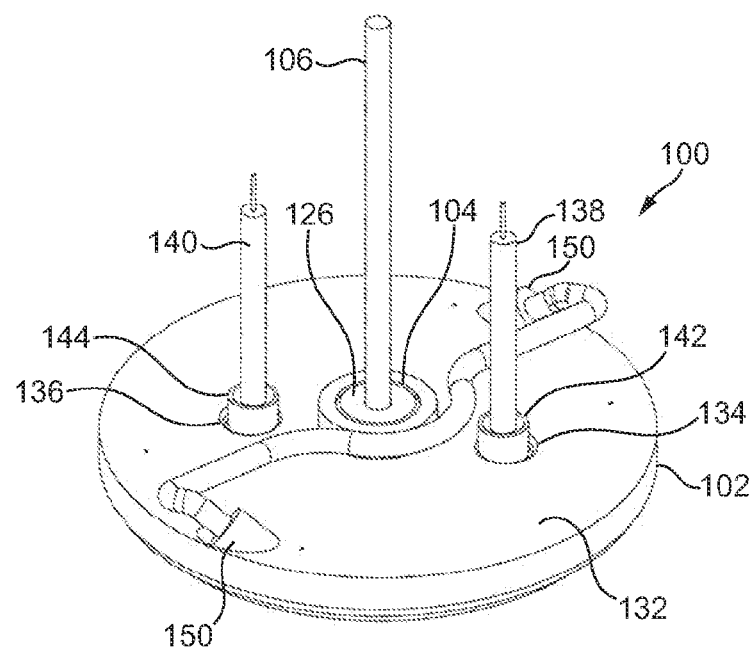
FIG. 10a is a perspective view from below of a second embodiment of the invention.
Figure 10B:
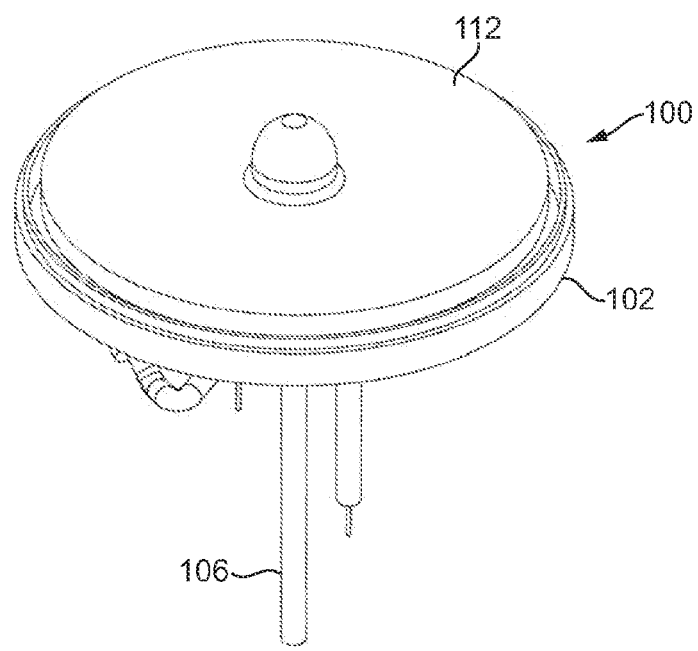
FIG. 10b is a perspective view from above of the second embodiment of the invention.
Figure 11:
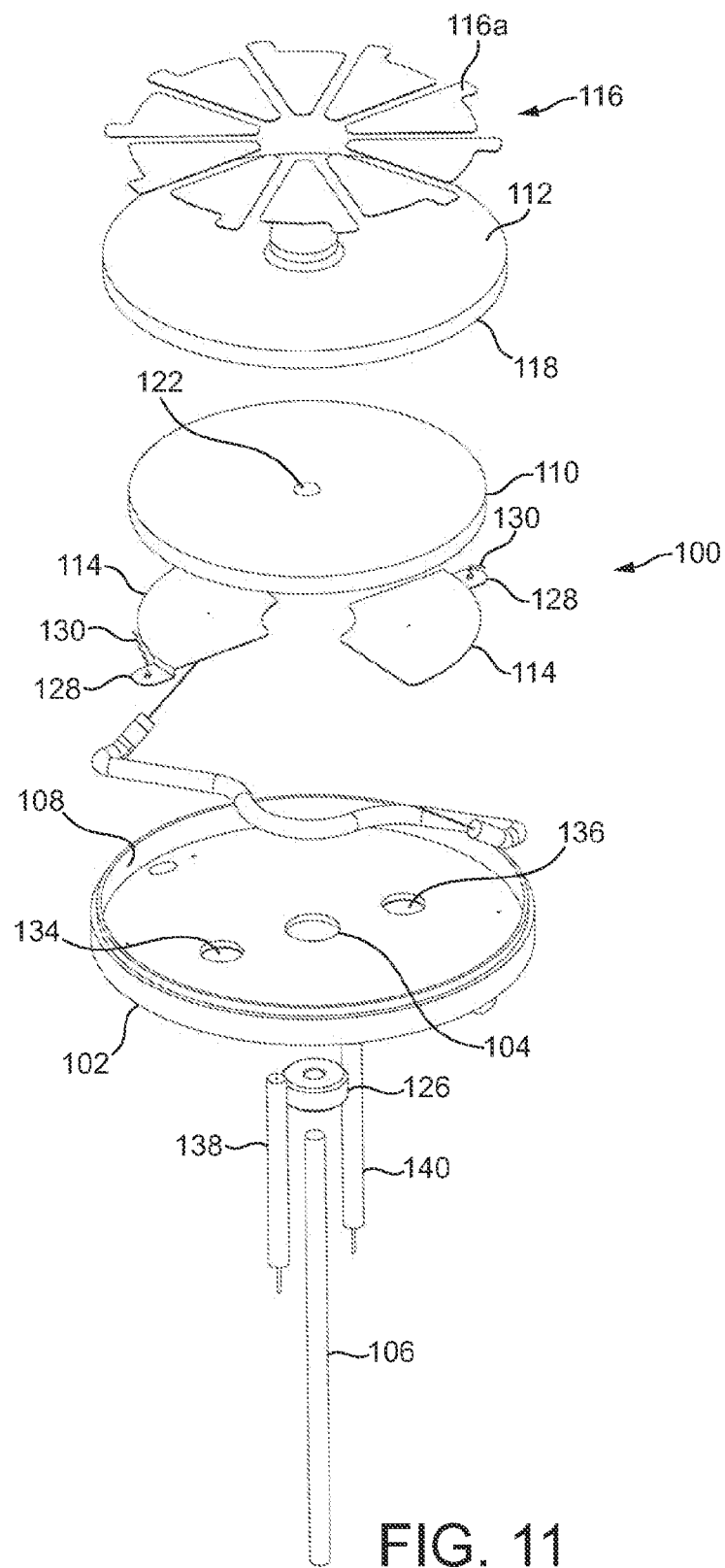
FIG. 11 is an exploded perspective view of FIG. 10b.
Figure 12:
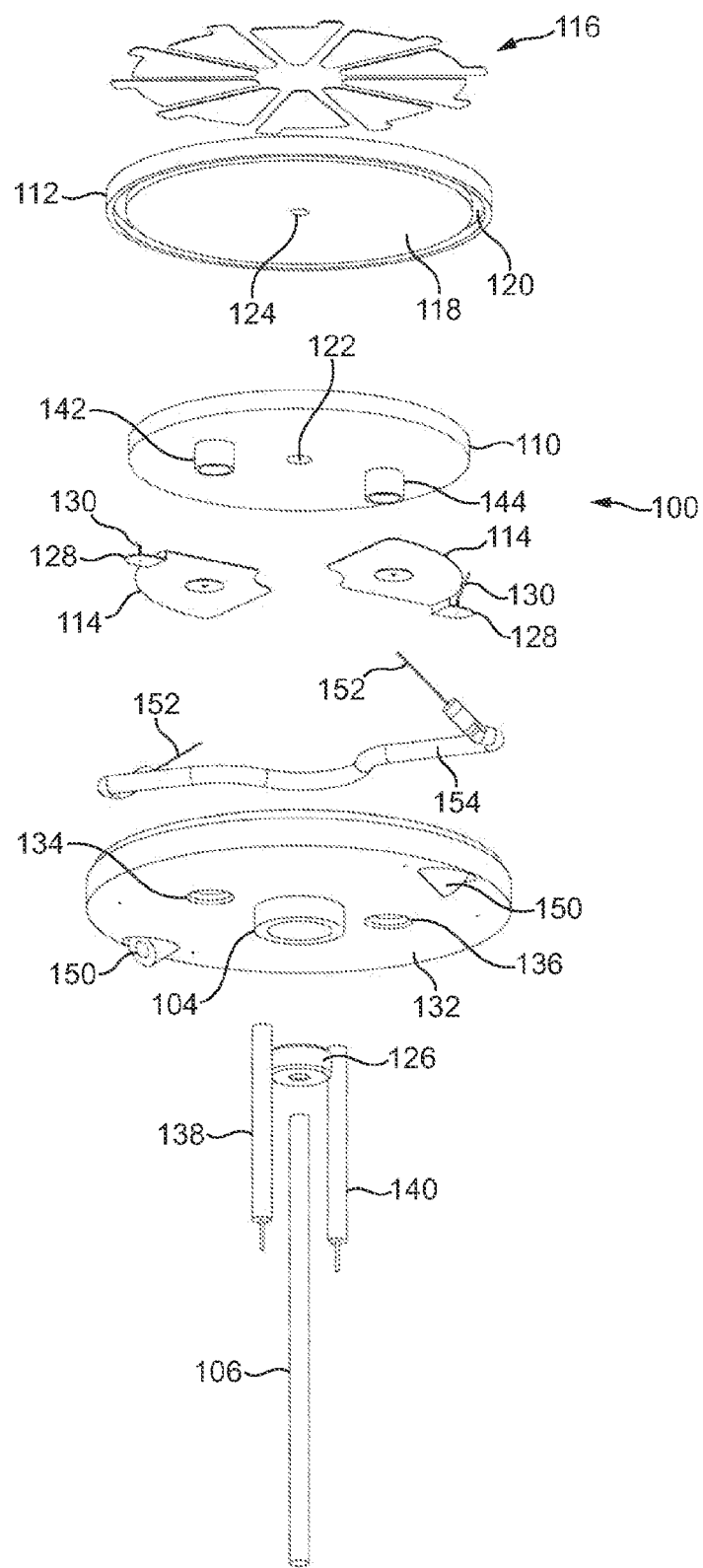
FIG. 12 is an exploded perspective view of FIG. 10a, and FIG. 13 is a cross section view of the second embodiment of the invention.
Figure 13:
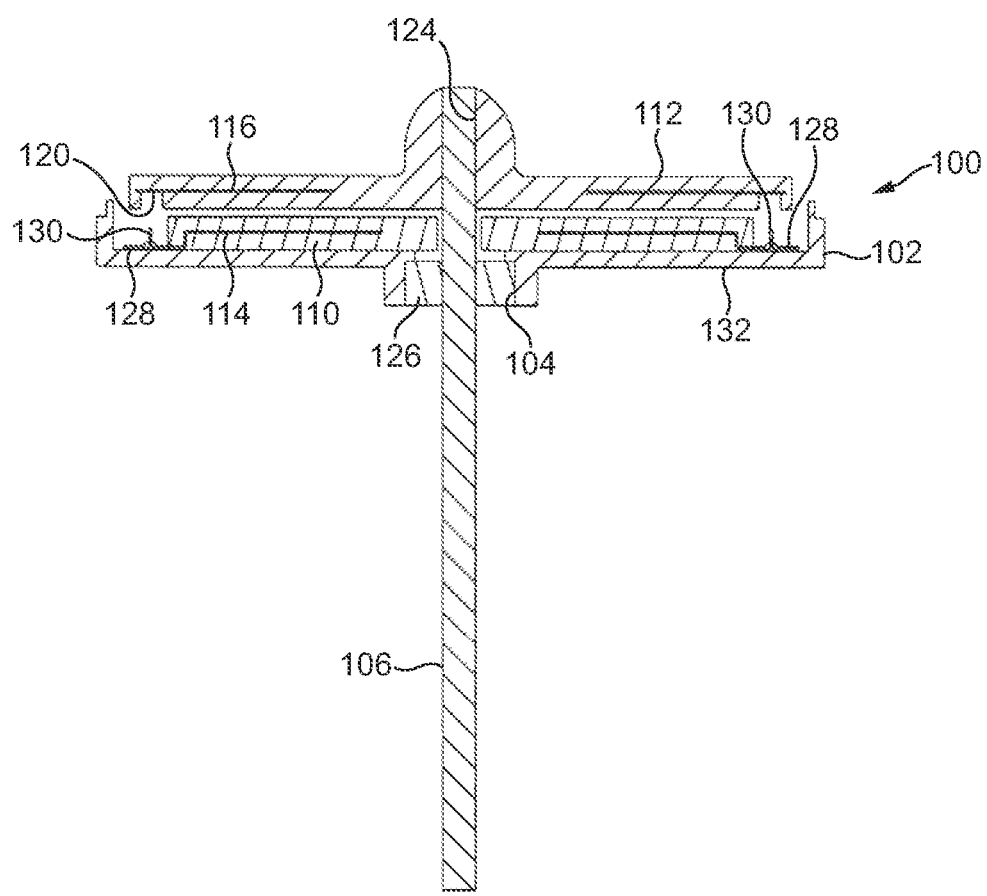

Referring in particular to FIGS. 10a and 12, the underside face 132 of the housing 102 is provided with several features that permit electrical connections to be made to the upper and lower disks.

More specifically, first and second apertures 134, 136 are provided in the housing 102 alongside the hub 104 and provide an access point for respective first and second high voltage leads 138, 140 that are received in through the apertures 134, 136 and through respective access points 142, 144 provided in the underside surface of the lower disk 110 so as to contact a respective one of the conductive segments 114. During operation of the machine, the high voltage leads 138, 140 provide an electrical connection between the conductive segments 114 and a suitable electrical load (not shown).

The underside face of the housing 102 is also provided with two obliquely extending ports 150 located at a radially outer position relative to the high voltage access points. Note that in the configuration shown, the ports 150 lie in a vertical plane which passes through the hub 104, but which is perpendicular to the vertical plane shared by the access points 134, 136. It will be appreciated, however, that this is not an essential feature of the invention and a different relative spacing between the access points and the ports is also acceptable.

The ports 150 provide access to respective tips 152 of a neutralizing rod 154 in the form of an insulated wire lead which lies transversely across the underside face 132 of the housing 102. Each tip 152 of the neutralizing rod 154 extends through its respective port 150 and terminates in the outer track 120 of the upper disk 112 so that they are in electrical contact with the exposed portions of the conductive sectors 116. As the upper disk 112 rotates, the tips 152 of the neutralizing rods 154 are dragged around the track 120 thereby contacting each of the conductive sectors in turn. Charge is therefore moved between conductive sectors to maintain the charge imbalance between the conductive sectors in the upper disk and the segments in the lower disk. The neutralising rod therefore functions in the same way as the neutralizing rod 50, 52 described above with reference to the first embodiment of the invention.

It should be noted that although the electrical influence machine 100 in FIGS. 10 to 13 does not feature an integrated turbine for driving the device such as that provided in the first embodiment of the invention, the skilled person will appreciate that such a modification could also be made to the machine of the second embodiment of the invention, by appropriate reconfiguration of the upper and lower disks 112, 110 to accommodate an air flow path and a turbine to drive the upper disk 112, in a similar manner to the first embodiment, or by the provision of a separate turbine spaced from the machine but connected to the spindle 106 for driving the upper disk 112.

The invention claimed is:

1. A surface treating appliance including an electrical influence machine comprising a first non electrically conductive support structure spaced from a second non electrically conductive support structure, at least one of the support structures being arranged to move with respect to the other support structure, and at least two charge collecting points, and further comprising an air turbine for rotating at least one of the support structures.

2. The surface treating appliance according to claim 1, further comprising an electrostatic filter.

3. The surface treating appliance according to claim 1, wherein the electrical influence machine is an ozone generator.

4. The surface treating appliance according to claim 1, comprising four charge collecting points.

5. The surface treating appliance according to claim 1, wherein the support structures are contra rotatable.

6. The surface treating appliance according to claim 1, wherein the electrical influence machine further comprises a plurality of electrically conductive sectors positioned on or embedded in opposed surfaces of the first and second support structures.

7. The surface treating appliance according to claim 6, wherein the electrical influence machine further comprises a first electrically conductive neutralizing rod and a second electrically conductive neutralizing rod, each electrically conductive neutralizing rod having a first end and a second end, the first and second ends of the first electrically conducting neutralizing rod being in contact with opposed sectors on the first support structure and the first and second ends of the second electrically conductive neutralizing rod being in contact with opposed sectors on the second support structure, the first and second neutralizing rods being in electrical contact with each other.

8. The surface treating appliance according to claim 6, wherein one or more of the electrically conductive sectors comprises a material with a specific surface area greater than the specific surface area of a self-supporting metal foil.

9. The surface treating appliance according to claim 6, wherein one or more of the electrically conductive sectors comprises a granular material, powder or a material which has had its specific surface area increased.

10. The surface treating appliance according to claim 6, wherein one or more of the electrically conductive sectors comprises a material with a specific surface area greater than $0.7\ m^2/g$.

11. The surface treating appliance according to claim 6, wherein one or more of the electrically conductive sectors comprises a material with a specific surface area of at least 1 order of magnitude greater than a metal foil.

12. The surface treating appliance according to claim 6, wherein one or more of the electrically conductive sectors comprises a material with an effective surface area greater than $500\ mm^2$.

13. The surface treating appliance according to claim 1, comprising a first air turbine for rotating the first support structure in a first direction and a second air turbine for rotating the second support structure in a second direction.

14. The surface treating appliance according to claim 1, wherein the air turbine is driven by airflow through the surface treating appliance during use.

15. The surface treating appliance according to claim 1 further comprising at least one cyclonic separator.

\* \* \* \* \*